(12) United States Patent
Amrhein et al.

(10) Patent No.: US 6,236,130 B1
(45) Date of Patent: May 22, 2001

(54) METHOD AND ARRANGEMENT FOR THE EXCITATION OF THE JOURNALLING WINDING AND THE DRIVE WINDING SYSTEMS IN ELECTRICAL MACHINES WITH MAGNETIC JOURNALLING, AND AN ELECTRICAL DRIVE

(75) Inventors: Wolfgang Amrhein, Ottensheim; Siegfried Silber, Kirchschlag, both of (AT)

(73) Assignees: Sulzer Electronics AG, Winterthur (CH); Lust Antriebstechnik GmbH, Lahnau (DE)

( * ) Notice: Subject to any disclaimer, the term of this patent is extended or adjusted under 35 U.S.C. 154(b) by 0 days.

(21) Appl. No.: 09/381,775
(22) PCT Filed: Feb. 1, 1999
(86) PCT No.: PCT/CH99/00043
 § 371 Date: Nov. 12, 1999
 § 102(e) Date: Nov. 12, 1999
(87) PCT Pub. No.: WO99/40334
 PCT Pub. Date: Aug. 12, 1999

(30) Foreign Application Priority Data

Feb. 3, 1998 (AT) .................................................. 189/98

(51) Int. Cl.$^7$ .................................................. F16C 39/06
(52) U.S. Cl. .................... 310/90.5; 318/611; 318/716; 318/717
(58) Field of Search .................. 310/90.5; 318/716, 318/717, 718, 35, 611

(56) References Cited

U.S. PATENT DOCUMENTS 3,650,581 * 3/1972 Boden et al. .................. 310/90.5
3,845,997 * 11/1974 Boden et al. .................. 310/90.5
4,841,204 * 6/1989 Studer .................. 318/254
5,084,643 * 1/1992 Chen .................. 310/90.5
5,130,589 * 7/1992 Kanemitsu .................. 310/90.5
5,202,824 * 4/1993 Chen .................. 310/90.5
5,471,106 * 11/1995 Curtis et al. .................. 310/90.5
5,625,240 * 4/1997 Bernus .................. 310/90.5
5,666,014 * 9/1997 Chen .................. 310/90.5
5,821,656 * 10/1998 Colby et al. .................. 310/90.5
5,834,867 * 11/1998 Kikuchi et al. .................. 310/51
5,925,957 * 3/1972 Chapman .................. 310/90.5

FOREIGN PATENT DOCUMENTS

0739078A2  10/1996  (EP) .
 2239038   2/1975  (FR) .
WO 95/18925  7/1995  (WO) .

* cited by examiner

*Primary Examiner*—Burton Mullins
(74) *Attorney, Agent, or Firm*—Townsend and Townsend and Crew LLP

(57) ABSTRACT

A method for the excitation of the radial force and torque winding systems of electrical drives with integrated magnetic bearings. The drives comprise an electrical machine with torque and radial force windings which are introduced in the stator or rotor, a position and angle sensor system and analog or digital electronic circuitry for the control, regulation, monitoring and feeding of the machine. A model is used for setting the rotor position (36,37) and the rotational angle of the rotor ($\phi$) which describes the relationship between the forces acting radially and tangentially at the rotor or at the stator respectively and the loop currents, and indeed in such a manner that it takes into account the deviations from the sinusoidal form of the force components, which depend on the rotational angle of the rotor ($\phi$).

12 Claims, 18 Drawing Sheets

METHOD AND ARRANGEMENT FOR THE EXCITATION OF THE JOURNALLING WINDING AND THE DRIVE WINDING SYSTEMS IN ELECTRICAL MACHINES WITH MAGNETIC JOURNALLING, AND AN ELECTRICAL DRIVE

BACKGROUND OF THE INVENTION

The invention relates to a method and to an arrangement for the excitation of the journalling winding and the drive winding systems in magnetically journalled electrical machines for the purpose of the impressing of angle independent forces and torques and to a corresponding electrical drive.

Magnetic journalling technology opens up fields of application in the construction of machines and apparatuses with extremely high demands on the speed of rotation range, the lifetime, the purity and the imperviousness of the drive system—thus substantially fields of application which cannot or can only with difficulty be realized using conventional journalling techniques. Various embodiments, such as for example high speed milling and grinding spindles, turbocompressors, vacuum pumps, or pumps for highly pure chemical or medical products are already being equipped with magnetic bearings.

A conventional magnetically journalled machine (FIG. 1) requires, in addition to a machine unit 1, two radial magnetic bearings 2 and 3, an axial magnetic bearing 4, two mechanical intercept bearings 5 and 6, as well as a total of ten power controllers 7, 8, 9 and 10 for the excitation of the motor and magnetic journalling loops. There are suggestions in the literature (FIG. 2) for integrating machines and radial magnetic bearings in a magnetic stator unit. Two separate winding systems 11 and 12 for drive and journalling force windings are introduced in multiple layers into grooves in a stator. Both winding systems have three loops and differ by one in the number of pole pairs. The coils are wound with fractional pitch and distributed over a plurality of grooves, through which an approximately sinusoidal flux linkage is achieved:

4-pole drive winding 11 (outer): first loop 13, second loop 14, third loop 15 two-pole bearing winding 12 (inner): first loop 16, second loop 17, third loop 18

The machine cross-sections illustrated in the figures are by way of example and are partly highly simplified and serve exclusively for the more precise explanation of the principle of operation.

Previously realized excitation concepts require sinusoidally distributed air gap flux densities and sinusoidal armature current layers. Distributed winding systems are thereby required (FIG. 2).

SUMMARY OF THE INVENTION

It is an object of the present invention to provide a method and an arrangement which is as uncomplicated and inexpensive as possible for the excitation of the journalling winding and drive winding systems of electrical machines with magnetic journalling in order to be able to impress a predetermined journalling force and torque behavior.

DESCRIPTION OF THE PREFERRED EMBODIMENTS

Figure 1:
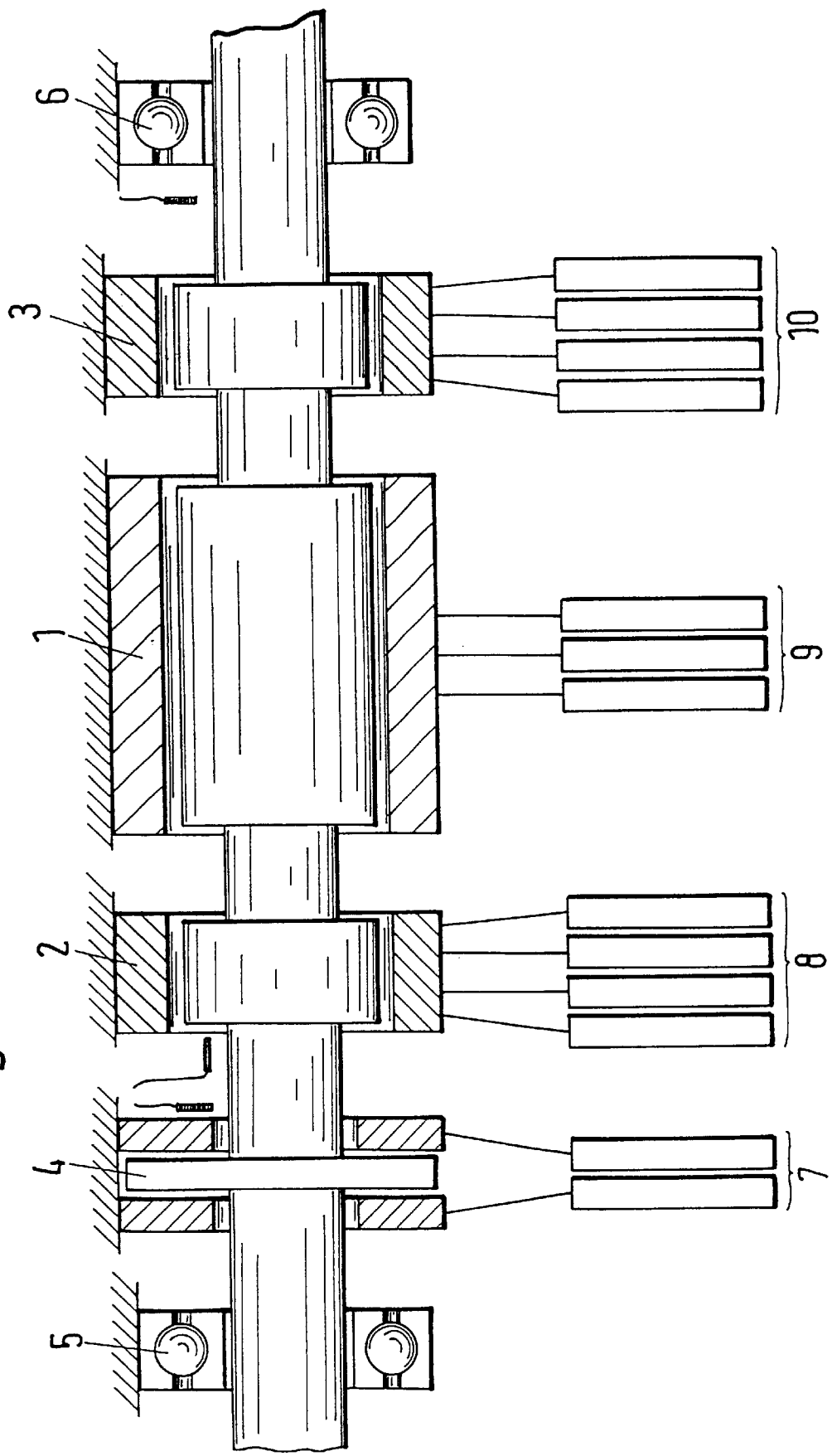
FIG. 1 shows a conventional electrical machine with magnetic journalling.
Figure 2:
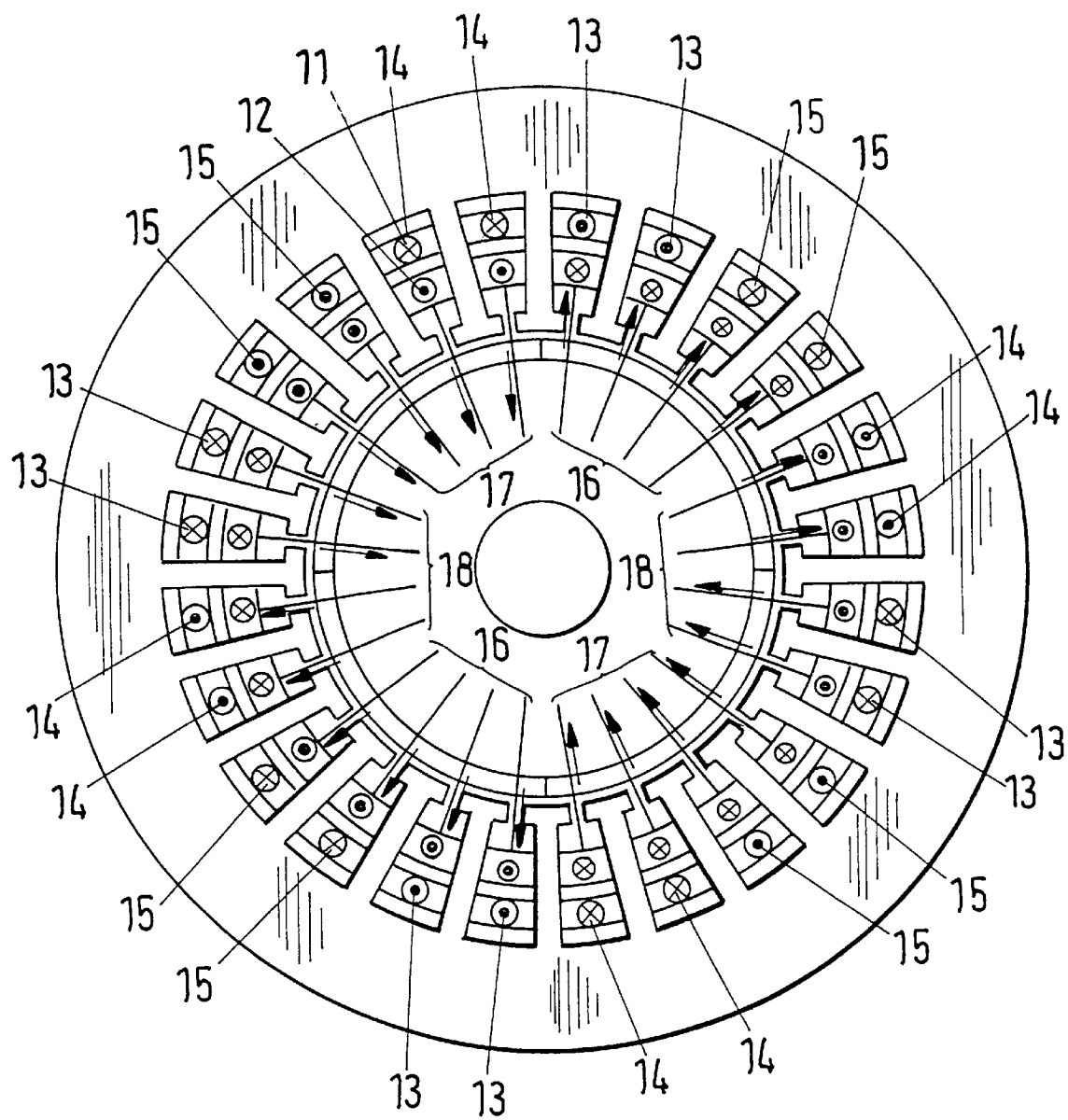
FIG. 2 shows a conventional electrical machine with magnetic journalling, in which the drive and journalling force winding systems are integrated into a magnetic stator unit.
Figure 3:
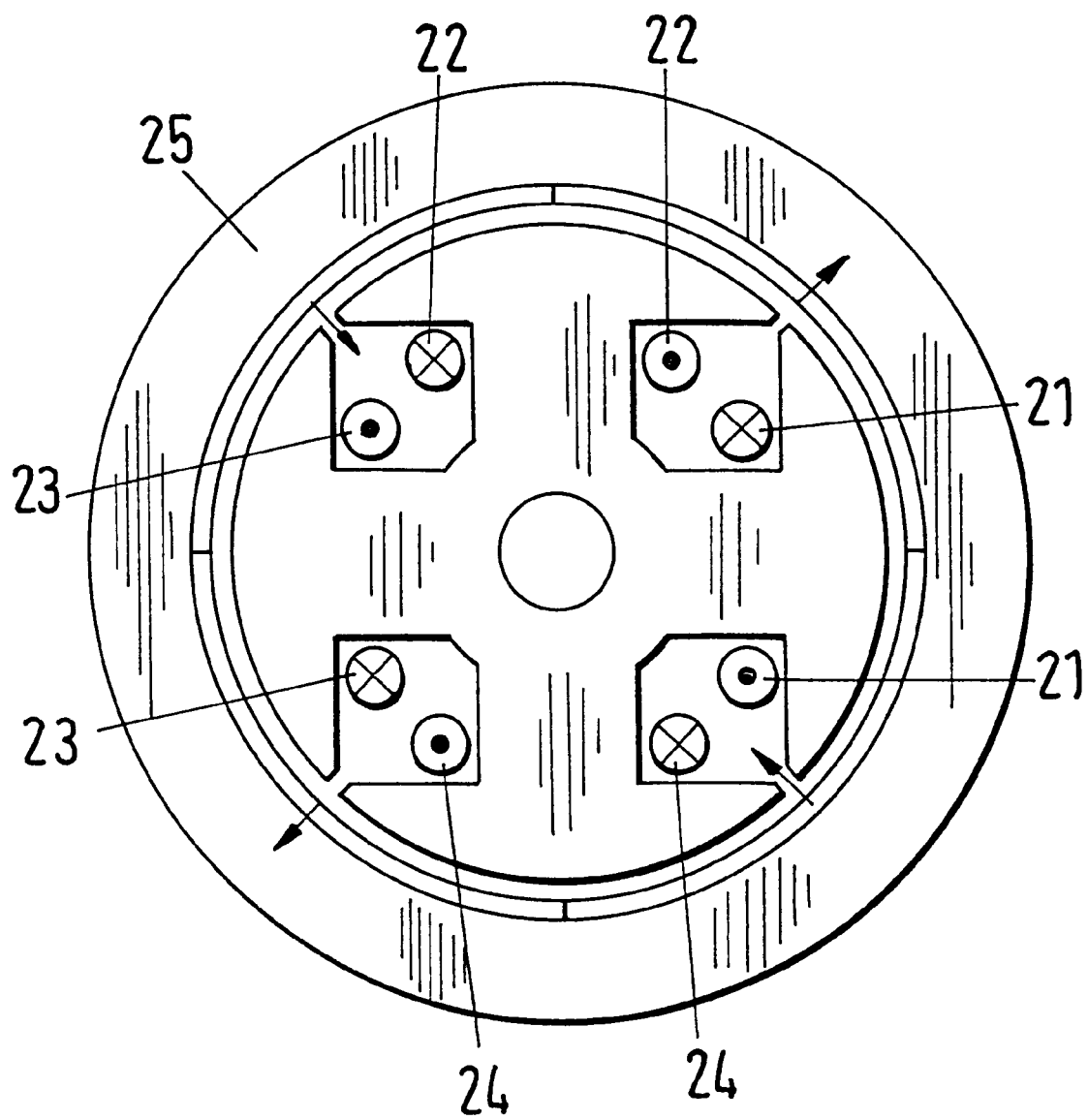
FIG. 3 shows an exemplary embodiment of an electrical machine with magnetic journalling (outer rotor) and reduced cost and complexity in which the method in accordance with the invention can be used, with the drive winding and the journalling force winding being one and the same winding.

FIG. 3 shows an embodiment of a machine with magnetic journalling with reduced cost and complexity. Through a corresponding current flow through the windings 21, 22, 23 and 24 both the torque and the journalling force can be predetermined. In this a non-contact journalling of the rotor 25 of the machine is possible. The arrows in the individual figures show in each case the direction of the magnetization of the individual permanent magnet segments.

Figure 4:
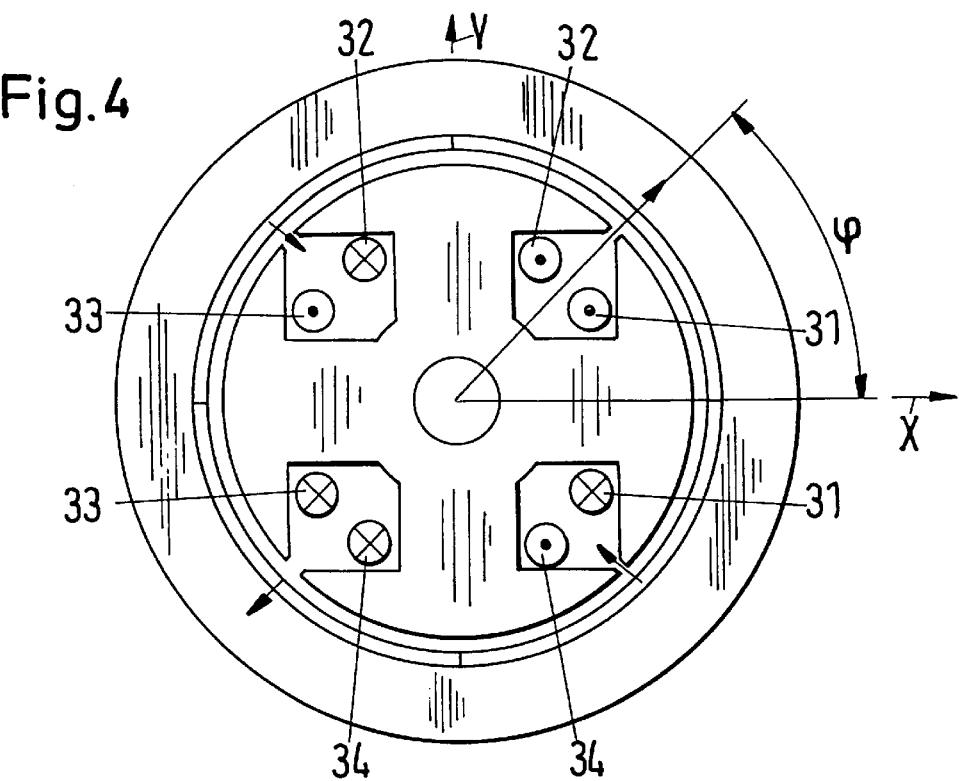
FIG. 4 shows an exemplary embodiment of a motor with magnetic journalling (outer rotor) and with four concentrated coils as well as a current flow through the concentrated coils for the production of a journalling force.
Figure 5:
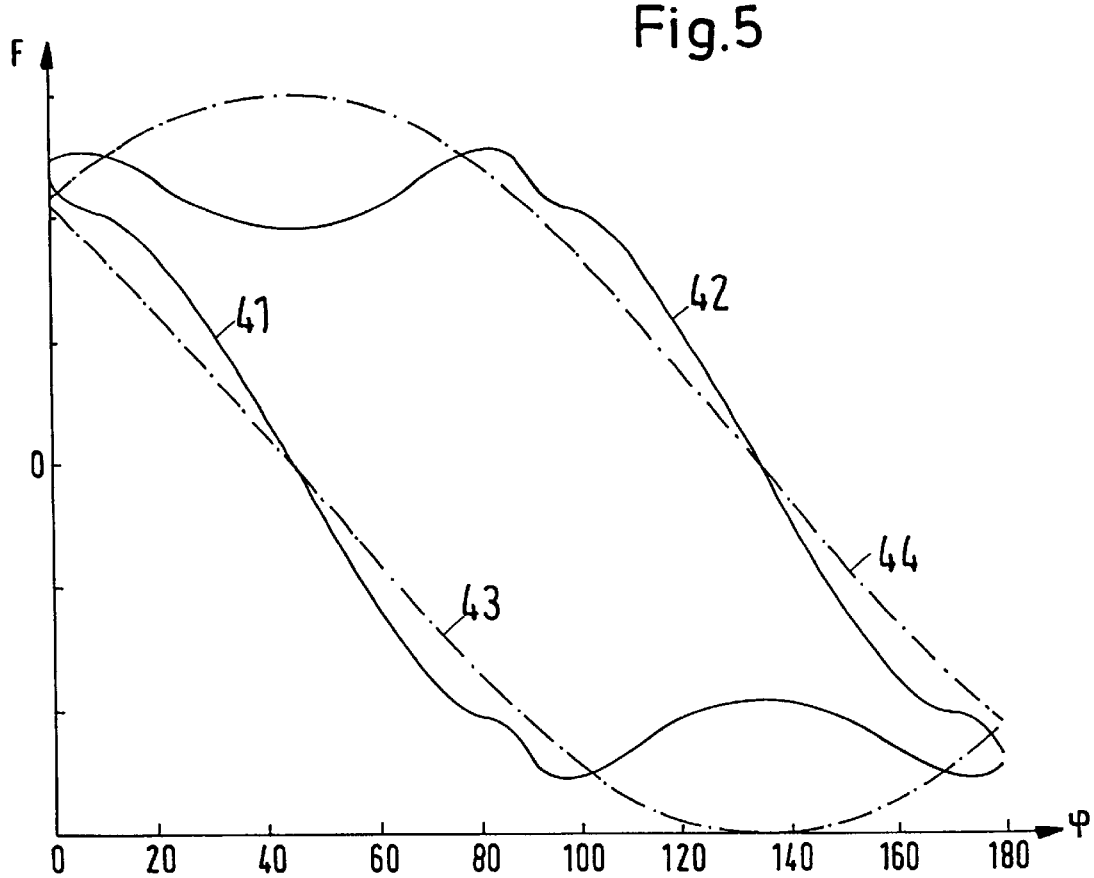
FIG. 5 is a plot of the journalling force which is produced by the current flow in accordance with FIG. 4.
Figure 6:
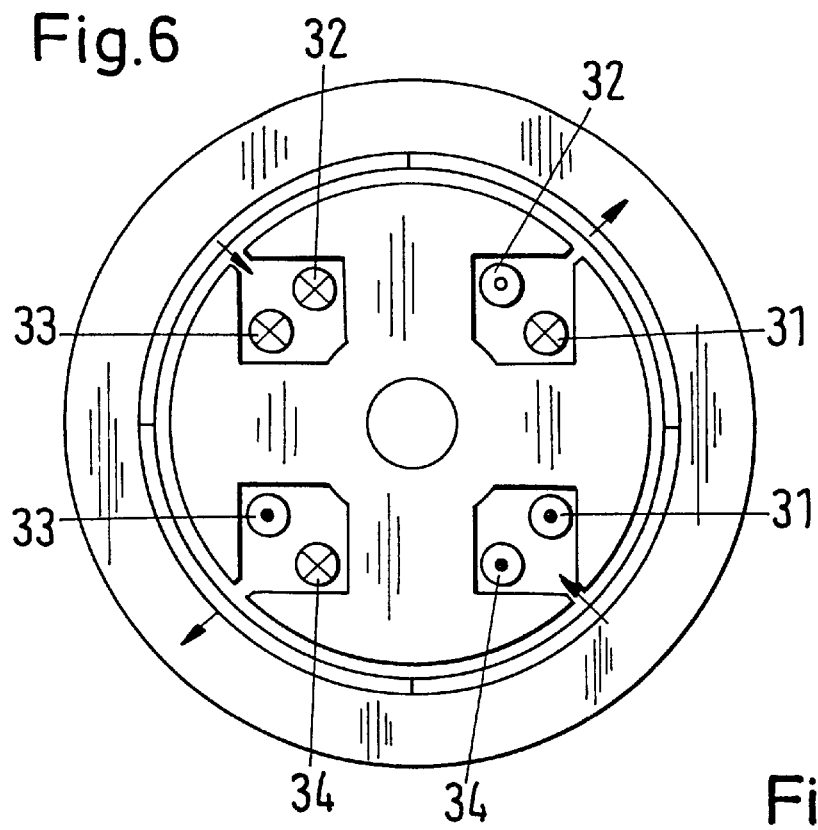
FIG. 6 shows an the exemplary embodiment of the motor in accordance with FIG. 4 with another current flow for the production of a journalling force.
Figure 7:
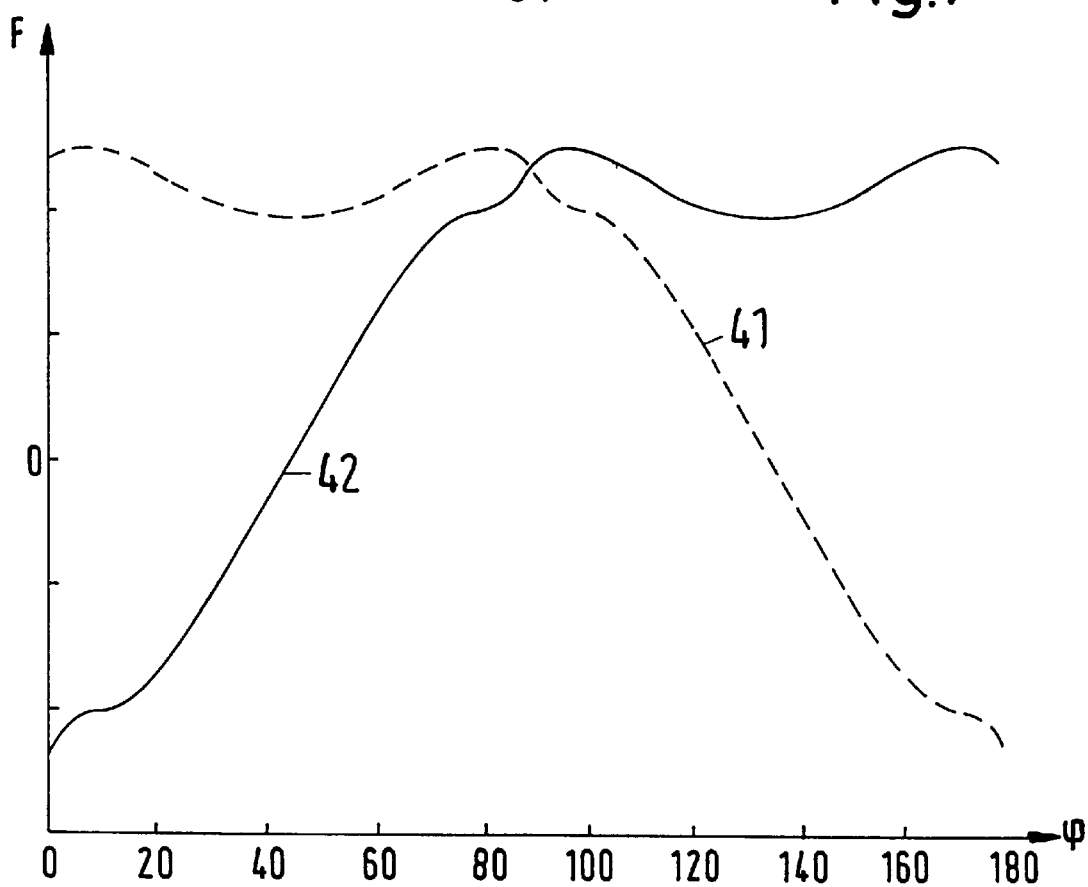
FIG. 7 is a plot of the journalling force which is produced by the current flow in accordance with FIG. 6.

FIG. 4 shows a motor with magnetic journalling (outer rotor) with four concentrated windings. Through the current flow through the coils 31, 32, 33 and 34 one has in dependence on the rotor angle $\phi$ (for the position of the rotor shown in FIG. 4 in the x or y direction respectively) in the rotor plane a force plot which is illustrated in FIG. 5. The force component 41 points in the x direction in a statorstationary, Cartesian coordinate system. Analogously, the force component 42 points in the y direction. Through the use of concentrated coils and the influence of the iron saturation, force plots arise which deviate strongly from a sinusoidal form, which is illustrated by the chain-dotted lines 43 and 44, for a constant current flow through the windings. These non-linearities furthermore effect a possible variation of the curve form in dependence on the loop or phase currents. In FIG. 6 a further possible current flow is given. The associated force plot is illustrated in FIG. 7.

The current flows through the coil systems illustrated in FIG. 4 and FIG. 6 effect a production of forces acting radially at the stator, the journalling or radial forces, with the electrical torque at these current flows remaining negligibly small. A torque can be achieved with the current flow of the coil systems illustrated in FIG. 8. The plot of the torque in dependence on the rotor angle also deviates from a sinusoidal form in the case of this current flow.

Figure 8:
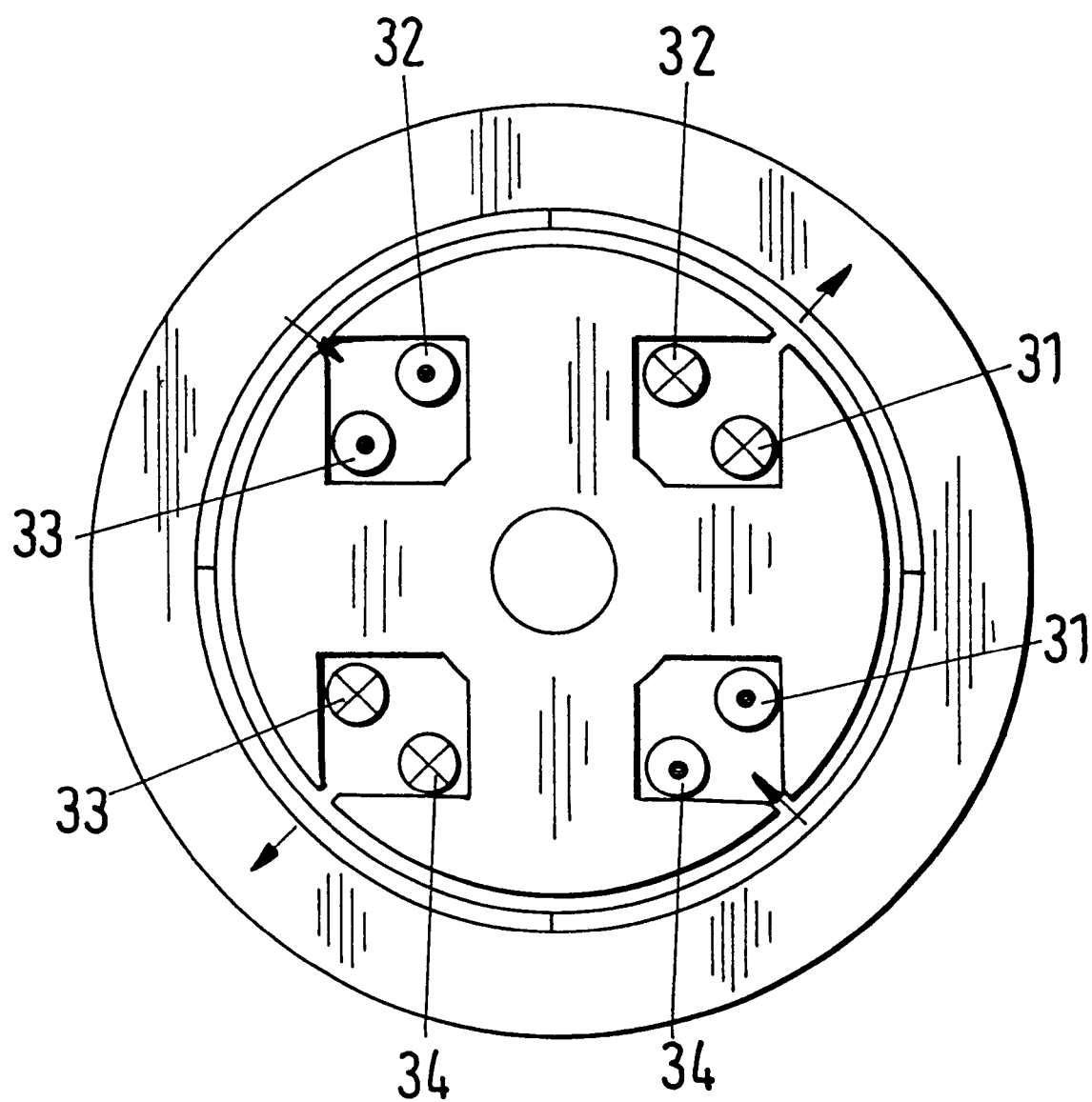
FIG. 8 shows an exemplary embodiment of the motor in accordance with FIG. 4 (outer rotor) with a current flow for the production of a torque.

If for a specific rotor angle and rotor position a force in the x and y direction and a torque are to be set, then the current flows illustrated in FIG. 4, FIG. 6 and FIG. 8 can be superimposed, with it being necessary to take into account the non-linearities which are present (e.g. iron saturation, eddy current losses) so that a linear superimposing of the currents is permissible only in exceptional cases.

In general the following relationship can be given for the force and torque production:

$$Q = f(I, \phi, x) \quad (1)$$

Here $$Q = \begin{bmatrix} F_x \\ F_y \\ M \end{bmatrix}$$

is the vector of the radial forces $F_x$ and $F_y$ and of the torque M, $$I = \begin{bmatrix} i_1 \\ i_2 \\ \vdots \\ i_n \end{bmatrix}$$

is the vector of the phase currents,
is the rotor angle, and $$x = \begin{bmatrix} x \\ y \end{bmatrix}$$

is the position of the rotor in the radial direction.

The forces and torques which develop are dependent on the rotor angle and the rotor position via nonlinear functions of the loop currents.

In order to simplify the position and torque regulation of the magnetically journalled motor it is favorable when a simple calculation of the phase currents can be carried out for a predetermined force and a predetermined torque. The vector of the phase currents can in principle be calculated from the nonlinear equation (1).

$$I = g(Q, \phi, x). \quad (2)$$

It will however be possible to give a closed solution for the relationship illustrated in equation (2) only for relatively simple arrangements. For this reason a linearization of equation (1) for the rest position of the system is recommendable:

$$Q = Q(I_0, \varphi, x_0) + \frac{\partial}{\partial x} Q(I_0, \varphi, x_0) \Delta x + \frac{\partial}{\partial I} Q(I_0, \varphi, x_0) \Delta I \quad (3)$$

From equation (3) $\Delta I$ can be given for predetermined radial forces and predetermined torques under the assumption of a regular matrix $$\frac{\partial}{\partial I} Q(I_0, \varphi, x_0):$$

$$\Delta I = \left( \frac{\partial}{\partial I} Q(I_0, \varphi, x_0) \right)^{-1} \left( Q - Q(I_0, \varphi, x_0) - \frac{\partial}{\partial x} Q(I_0, \varphi, x_0) \Delta x \right) \quad (4)$$

Equation (4) holds in general and is not restricted to a special winding configuration. Thus the required phase currents can be calculated both for magnetically journalled motors with common drive and journalling winding systems (FIG. 3), and for magnetically journalled motors with separate drive and radial force winding systems. The difference in the construction of the machines and the different loop numbers must be taken into account in equation (4).

Figure 11:
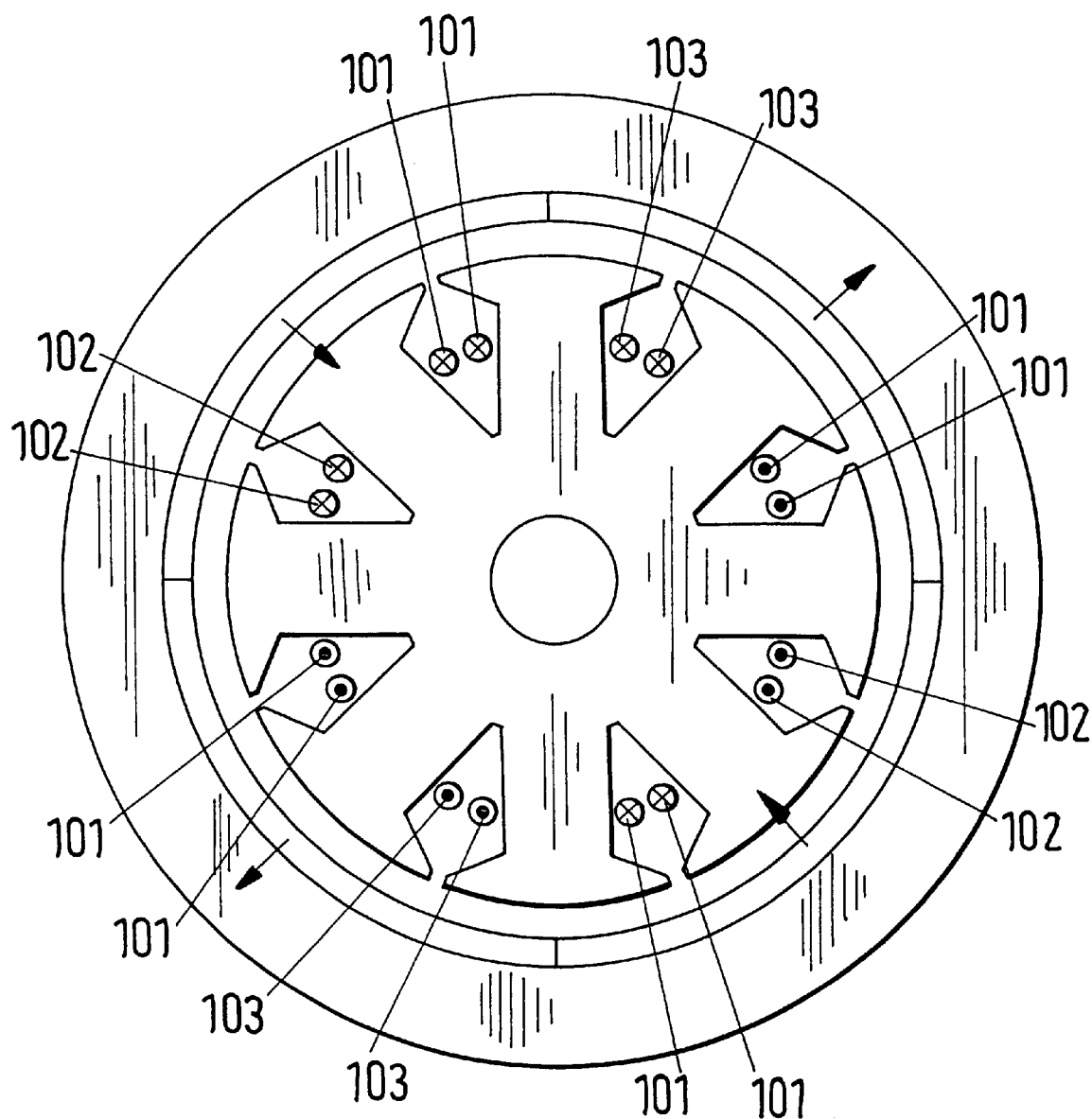
FIG. 11 shows an exemplary embodiment of a motor with magnetic journalling (outer rotor) and separate winding systems for the journalling force and torque production.

A magnetically journalled motor with separate drive and journalling winding systems is illustrated in FIG. 11. The torque is produced by means of the winding 101; the windings 102 and 103 produce the radial forces.

Figure 9:
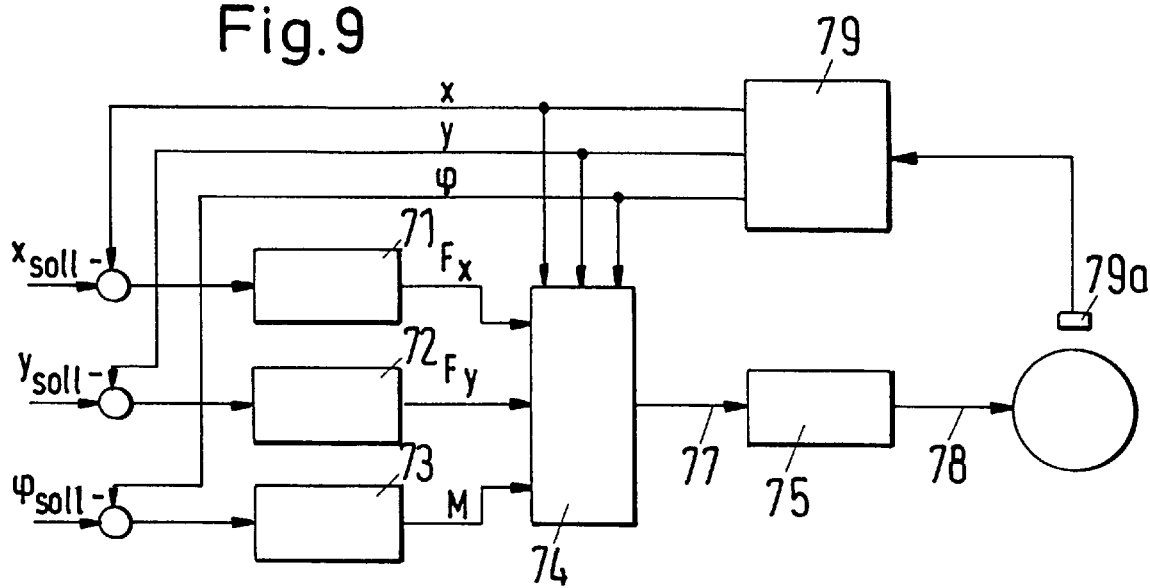
FIG. 9 shows an exemplary embodiment of an arrangement for carrying out the method in accordance with the invention.

An exemplary embodiment for a (total) arrangement for carrying out the method in accordance with the invention is illustrated in FIG. 9. Decoupled force regulators 71 and 72 and a torque regulator 73 can be designed independently of the mechanical construction. Desired current values are determined in a processor 74 from the torque and the force signals with the help of tables, prescriptions, equations or nonlinear and linear functions and, in the form of digital values or analog parameters (voltages or currents) 77, are converted by a power amplifier 75 into corresponding phase currents 78 or are amplified and excite the magnetically journalled motor 76. The rotor position and the rotor angle can be measured with a corresponding sensor system 79 with the help of a plurality of sensors (e.g. eddy current sensors or Hall sensors 79a) or calculated in a mathematical model from state parameters (parameters which result as calculation parameters in a stabilized rotor, e.g. coupling terms between the x and y direction).

The blocks 71, 72, 73 and 74 can either be implemented in a suitable digital processor in the form of arithmetic and logical functions, value tables and nonlinear and linear functions or built up through analog circuits or programmable and configurable integrated analog circuits.

A further simplification of the described method can be achieved when the linearization is carried out about the location $x_0=0$ (i.e. the rotor is located at the midpoint) and for $I=I_0$. Through this one obtains, with the vanishing of the terms $Q(I_0,\varphi,x_0)$ and $$\frac{\partial}{\partial x}Q(I_0,\varphi,x_0),$$

the simple relationship:

$$I = \left(\frac{\partial}{\partial I}Q(\varphi)\right)^{-1}Q. \quad (5)$$

Equation (5) can also be written in a simplified form as $$I=k(\varphi)Q. \quad (6)$$

In this $k(\varphi)$ is a matrix which is dependent on the rotor angle. The loop currents can thus be calculated with a matrix multiplication in the simplest case from the required radial forces and the torque.

Figure 15:
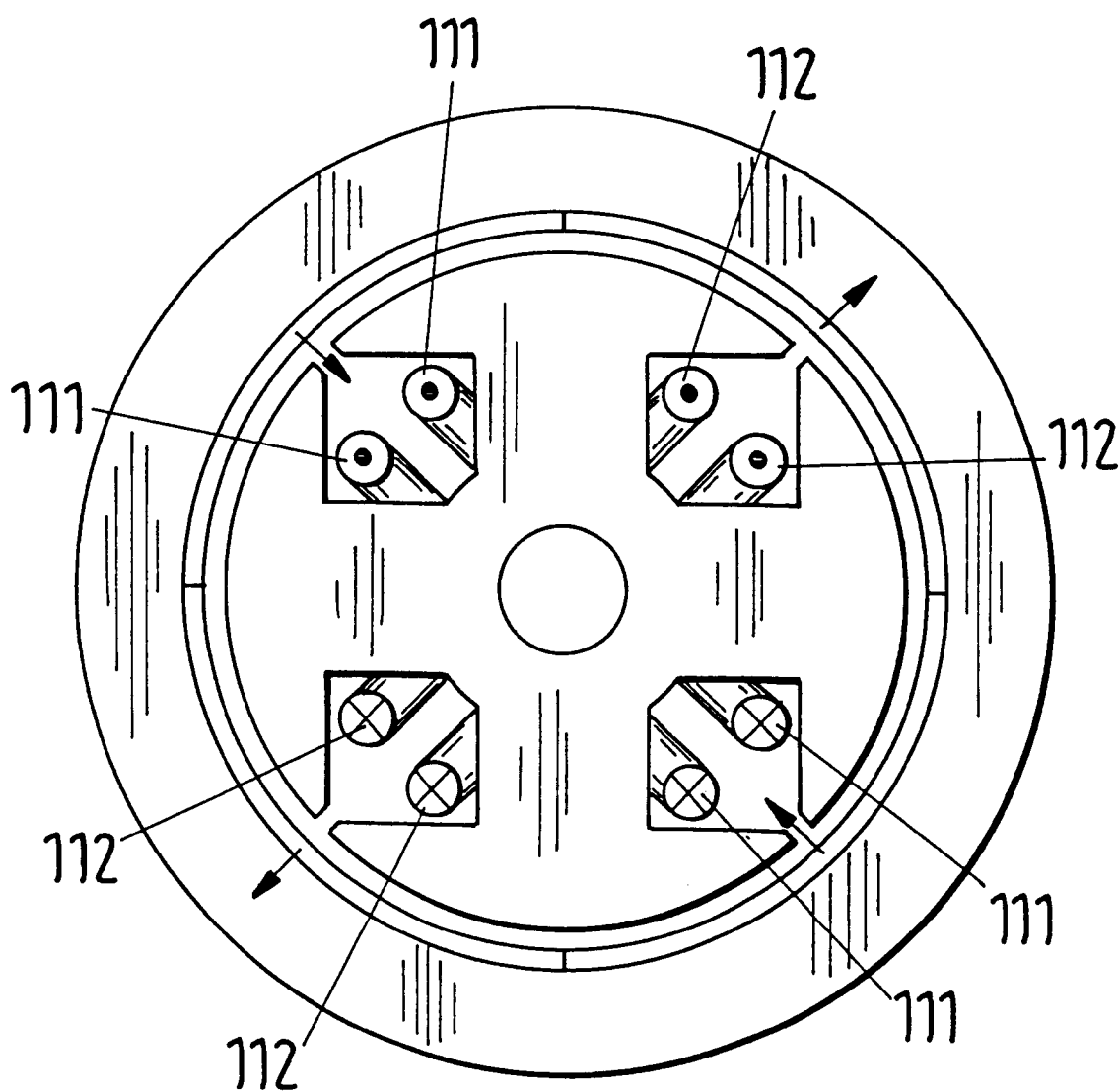
FIG. 15 shows the journalling winding of a single phase motor (outer rotor) with magnetic journalling on a stator with four grooves.
Figure 16:
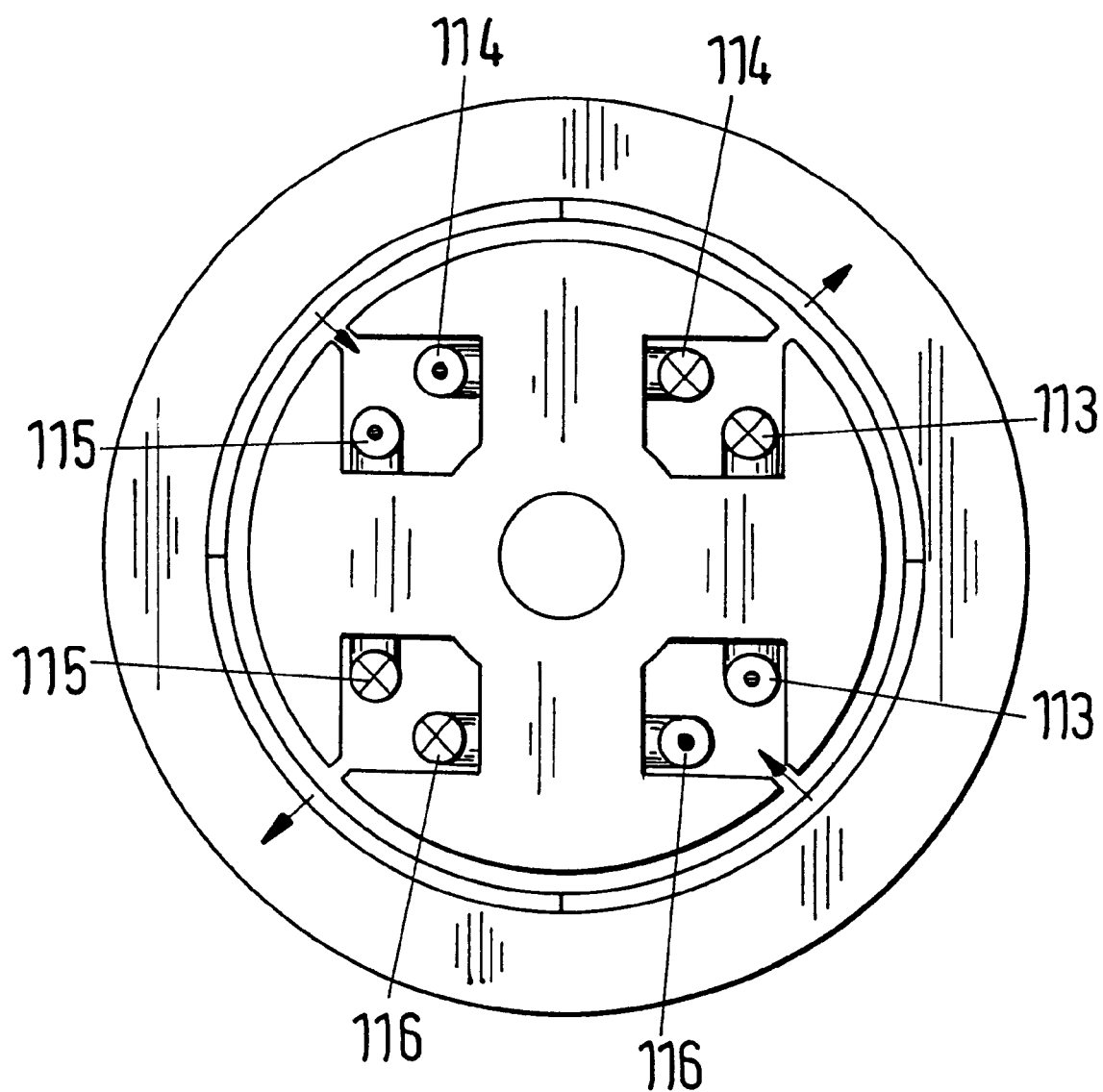
FIG. 16 shows the torque winding of a single phase motor with magnetic journalling (outer rotor) on the stator with four grooves in accordance with FIG. 15.

In order to be able to give an angularly independent matrix $k(\varphi)$ for the motor which is illustrated in FIG. 4, it is expedient to transform the four loop current components with the following transformation $$I = V\tilde{I}$$

with $$V = \begin{bmatrix} -1 & 1 & 1 \\ 1 & 1 & -1 \\ 1 & -1 & 1 \\ -1 & -1 & -1 \end{bmatrix}$$

to a system with three loops (combination of FIG. 15 with FIG. 16). Thus the calculations are carried out with $\tilde{I}$ instead of I. Through this one obtains a regular matrix $$\frac{\partial}{\partial \tilde{I}}Q(\tilde{I}_0,\varphi,x_0).$$

If in turn $x_0=0$ is inserted, then one has the following simple relationship:

$$\left(\frac{\partial}{\partial \tilde{I}}Q(\varphi)\right)^{-1} = k(\varphi) = \begin{bmatrix} k_{11}(\varphi) & -k_{12}(\varphi) & 0 \\ k_{12}(\varphi) & k_{11}(\varphi) & 0 \\ 0 & 0 & k_{33}(\varphi) \end{bmatrix}$$

Figure 23:
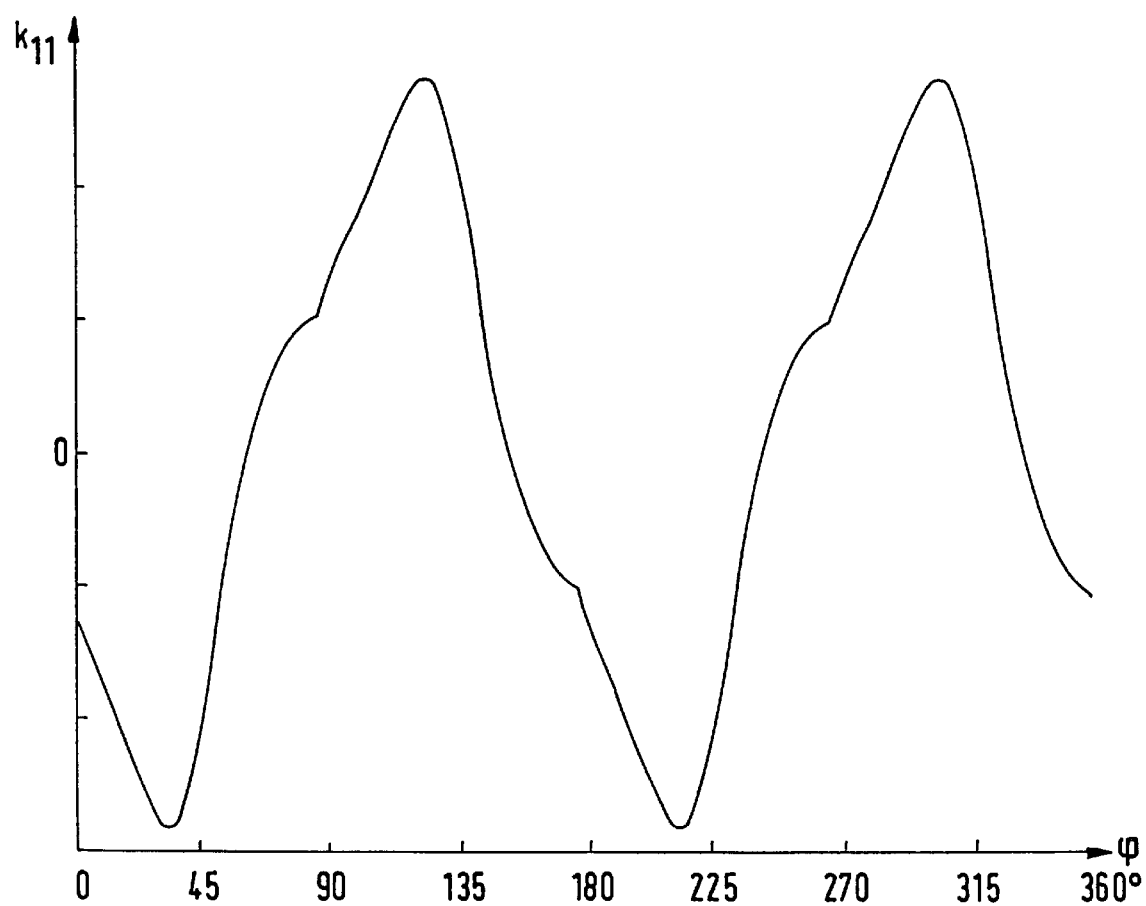
FIG. 23 is the plot of the coefficient $k_{11}(\phi)$ of an angularly dependent matrix $k(\phi)$ for a rotation of the rotor by 360°, with the matrix $k(\phi)$ representing the relationship between the loop currents and the forces or the torque respectively.
Figure 24:
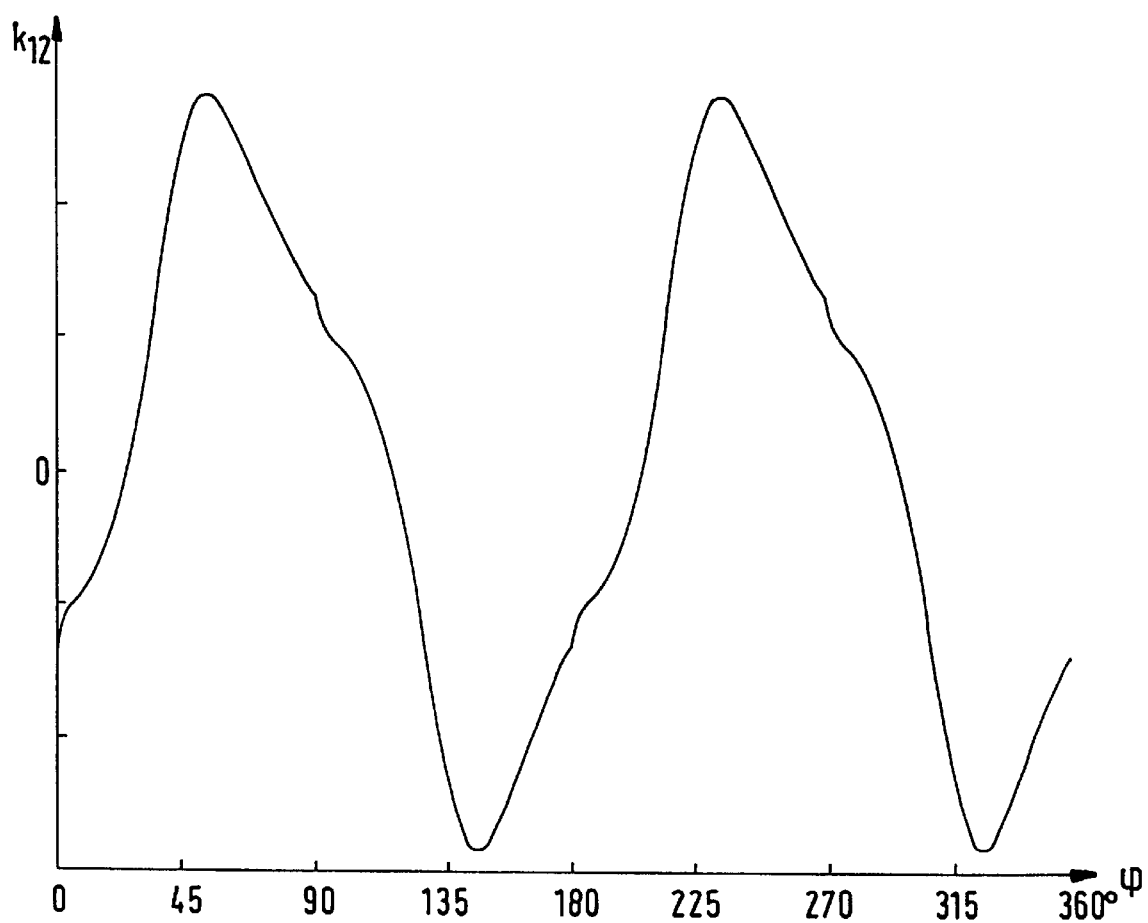
FIG. 24 is the plot of the coefficient $k_{12}(\phi)$ and of the matrix $k(\phi)$
Figure 25:
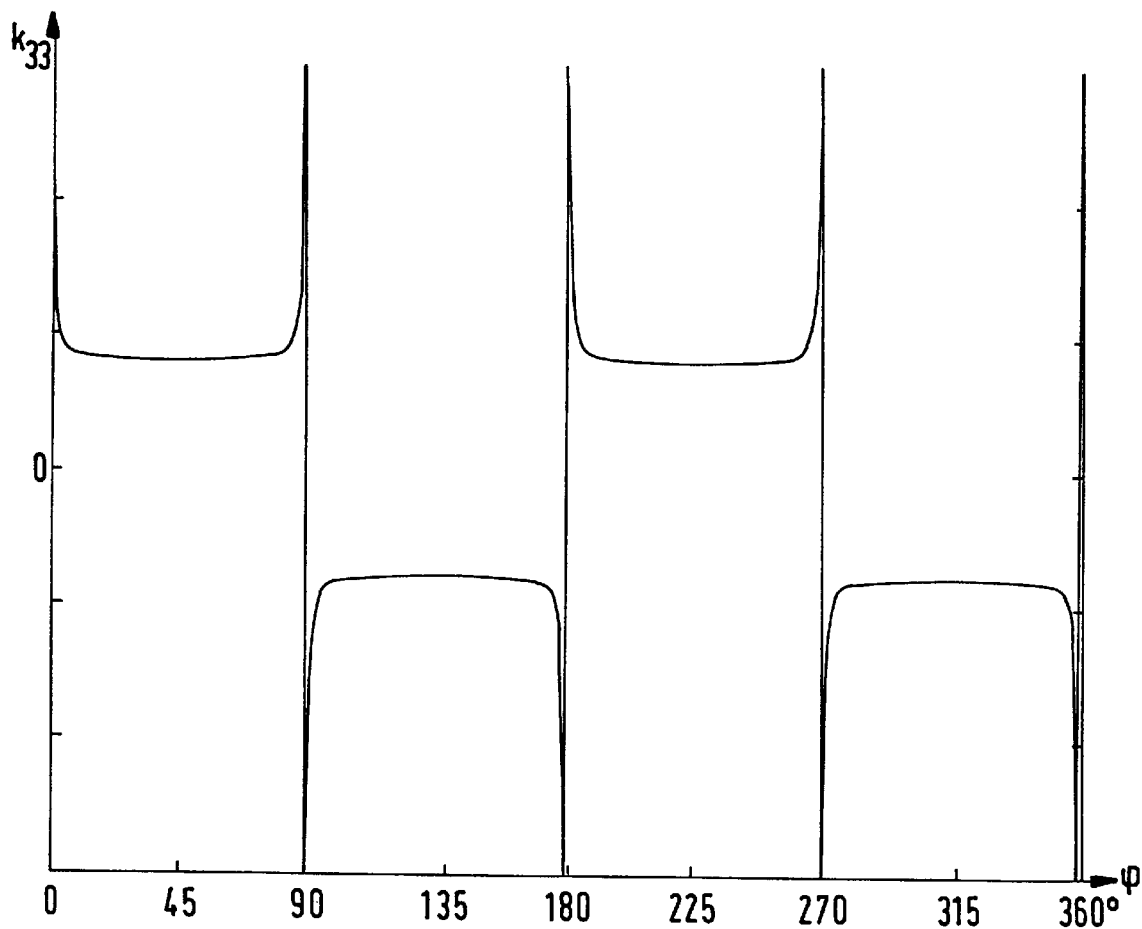
FIG. 25 is the plot of the coefficient $k_{33}(\phi)$ of the matrix $k(\phi)$.

FIG. 23 shows the plot of $k_{11}(\varphi)$ for a rotation of the rotor of 360°. The plot of $k_{12}(\varphi)$ is illustrated in FIG. 24. The plot $k_{33}(\varphi)$ of and thereby the current requirement for a constant torque can be derived from FIG. 25.

As the matrix $k(\varphi)$ shows in an exemplary manner, currents can be found with the help of the preceding equations which lead to an extensive decoupling of the radial and tangential force components.

This is important in particular for the regulation of the forces in the direction of the machine coordinates x and y as well as for the regulation of the torque in order to be able to intentionally influence the radial forces on the one hand and the torque on the other hand with separate current setting parameters. Another possibility would consist in achieving the desired effect with a decoupling network which is implemented in the electrical circuit, e.g. in the processor. This measure is recommendable in particular when a voltage regulation is to be carried out instead of a current impressing via a current regulator. The realization can be carried out either by hardware or software.

The relationship between the phase currents and the radial forces (in the simplest case the matrix $k(\varphi)$ can be calculated either by means of analytic and numerical methods from the mathematical model of the magnetically journalled machine or determined by measurement, or determined from the setting parameters of the regulators or the phase currents through a reference or calibration run respectively starting from predetermined non-optimal force and current functions.

If the matrix $k(\varphi)$ is decomposed into Fourier coefficients then the following condition can also be stated:

$$I = \sum_{i=-\infty}^{\infty} \tilde{k}_i(i\varphi)Q. \quad (7)$$

Figure 10:
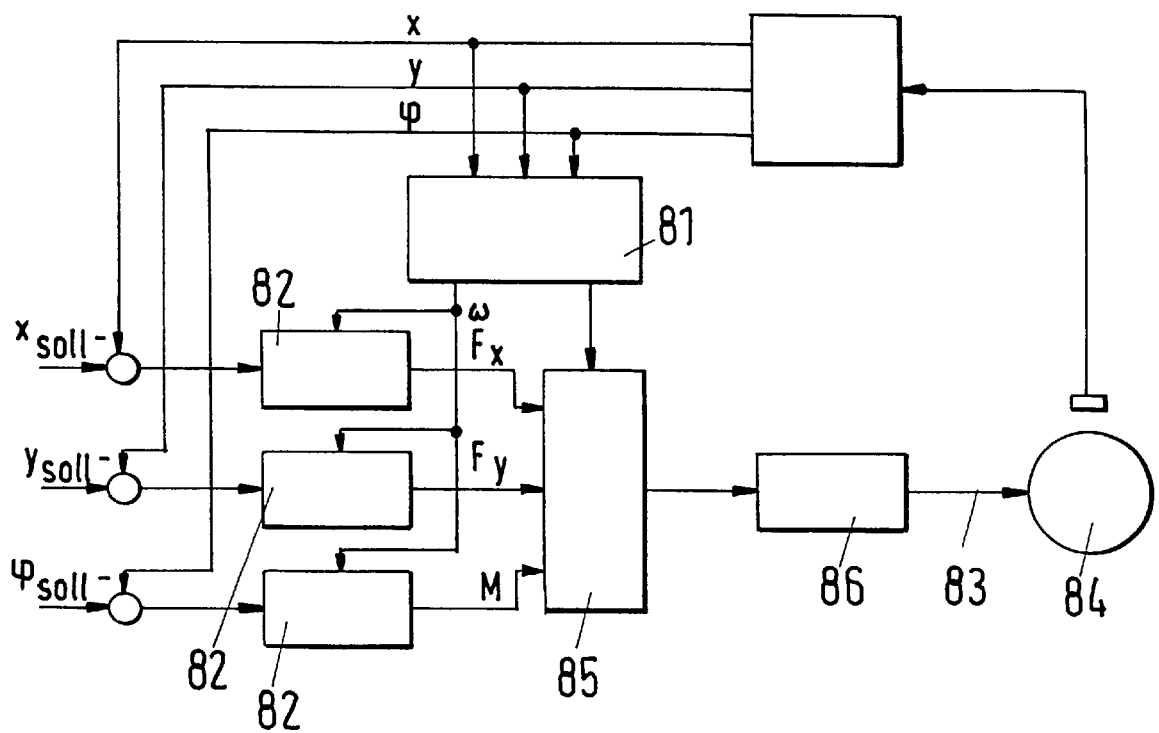
FIG. 10 shows a further exemplary embodiment of an arrangement for carrying out the method in accordance with the invention with a decoupling network.

Alternatively to the current impressing, a voltage 83 can also be impressed into the electrical connections of the magnetically journalled machine 84 through an additional decoupling network 81 in FIG. 10 and a modified regulator 82.

The described method can be used in particular for rotating magnetically journalled electrical machines (which are sometimes designated as "bearing-free motors"), but also in principle for magnetically journalled linear drives. In this the method is dependent neither on a specific loop number of the machine nor on a specific curve form of the air gap flux density and of the armature current layer, so that a use in various motor types, such as e.g. reluctance motors, asynchronous motors or synchronous motors, in particular permanent magnetically excited synchronous motors, is possible. The method in accordance with the invention and a corresponding arrangement have the advantage that a more simple construction of the magnetically journalled electromagnetic rotor or actors respectively results.

The method in accordance with the invention is thus a method for the excitation of the radial force and torque winding systems of electrical drives with integrated magnetic bearings, said drives comprising an electrical machine with torque and journalling windings which are introduced in the stator or rotor. Furthermore, these drives comprise a position and angle sensor system and analog or digital electronic circuitry for the control, regulation, monitoring and feeding of the machine. For the setting of the rotor position and of the rotational angle of the rotor, a model is used which describes the relationship between the forces acting radially and tangentially at the rotor or at the stator respectively and the phase currents, and indeed in such a manner that it takes into account the deviations from the sinusoidal form of the force components, which are dependent on the rotational angle of the rotor.

In this the model can advantageously be designed in such a manner that the tangential and radial force components are substantially decoupled independently of the rotational angle of the rotor. In this the influence of saturation and eddy current development can also be taken into account in the model.

In a further advantageous embodiment the deviation from the sinusoidal form of the force components acting radially at the rotor and stator respectively, which depend on the rotational angle of the rotor, can be corrected through correspondingly shaped loop current behaviors.

Likewise, in a further advantageous embodiment the deviation from the sinusoidal form of the torques which are formed by the forces acting tangentially on the rotor and the stator respectively, which are dependent on the rotational angle of the rotor, can be corrected through correspondingly shaped loop current behaviors.

The required phase currents can be impressed into the radial force and torque windings either directly as loop currents or where appropriate indirectly via voltages.

The already named decoupling of the tangential and radial force components can be effected or assisted with the help of a decoupling network which is implemented in the electrical circuit by means of hardware or software.

An operation behavior can also be impressed into the electrical drive which corresponds to the operation behavior of a machine with approximately sinusoidal exciter field distribution and approximately sinusoidal flux distribution. The phase currents can (see above) satisfy the relationship $$\Delta I = \left( \frac{\partial}{\partial I} Q(I_0, \varphi, x_0) \right)^{-1} \left( Q - Q(I_0, \varphi, x_0) - \frac{\partial}{\partial x} Q(I_0, \varphi, x_0) \Delta x \right)$$

and, in the region of the rest position $x_0=0$ of the rotor and in the region of $I=I_0$, the relationship $I = k(\phi) Q,$ with Q designating the vector of the radial forces and of the torque, $x_0$ designating the vector of the position of the rotor when the rotor is in a rest position, $\Delta x$ designating the deviation of the position of the rotor from a rest position, I designating the vector of the phase currents, $I_0$ designating the vector of the phase currents when the rotor is in the rest position $x_0$, $\Delta I$ designating the current variation, $\phi$ designating the rotational angle of the rotor, and $k(\phi)$ designating a matrix which is dependent on the rotational angle of the rotor $\phi$.

From the predetermined values for the forces and torques respectively in regard to the desired speed of rotation, the desired rotor position, the desired rotational angle or other predetermined desired values, state parameters such as the momentary values of voltages and currents in the radial force and torque windings, the position of the rotor, the rotational angle or parameters derived therefrom can be used in the determination of the required loop currents, with it being possible to determine these parameters either directly via sensors or indirectly and thereby without sensors from the current or voltage behaviors of the windings.

In separate journalling force and torque winding systems, separate phase currents for the feeding on the one hand of the radial force windings and on the other hand of the torque windings can be determined during the determination of the phase currents required for the control or regulation respectively of the radial and tangential forces.

In common radial force and torque winding systems, in the determination of the phase currents required for the control or regulation respectively of the radial and tangential forces, phase currents can be determined which contain both components for the radial force as well as components for the torque production, with the current components for the production of the radial forces and the current components for the production of the torques being superimposed in the loops.

For a given drive, optimized force and current functions can be determined through a reference or calibration run respectively starting from predetermined non-optimal force and current functions.

Corresponding remarks hold for the excitation of the radial force and torque winding systems of electrical drives with integrated magnetic bearing. The drive comprises an electrical machine with torque and radial force windings which are introduced in the stator or rotor. Furthermore, the drive comprises a position and angle sensor system and analog or digital electronic circuitry for the control, regulation, monitoring and feeding of the machine. The arrangement is suitable for carrying out the method explained above and comprises a plurality of electrical units, namely:

a sensor system or a computational circuit for the measurement or calculation respectively of state parameters such as the momentary values of the current and voltage in the radial force and torque windings, rotor position, rotational angle or parameters derived therefrom digital or analog circuits in which the regulation and other signal processings or evaluations respectively are implemented by hardware, by software or in the form of value tables, as well as analog or switched power controllers for the impressing of phase currents or loop voltages into the radial force and torque windings of the electrical machine.

Finally, the invention also relates to an electrical drive with an integrated magnetic bearing, with this drive having an arrangement for the excitation of the torque and radial force winding specified above or being operated in accordance with any one of the above-named method variants.

In the equations which are explained further above the relationships between forces, torques and the required currents are described in a general representation. The processing of the relationships e.g. in a microprocessor now presupposes that the relationships are present e.g. in tabular form or as equations or in a Fourier series expansion. As an example for the last-named case the relationship between $$Q = \begin{bmatrix} F_x \\ F_y \\ M \end{bmatrix}$$

and the currents is described in an exemplary manner in a Fourier series expansion.

Figure 12:
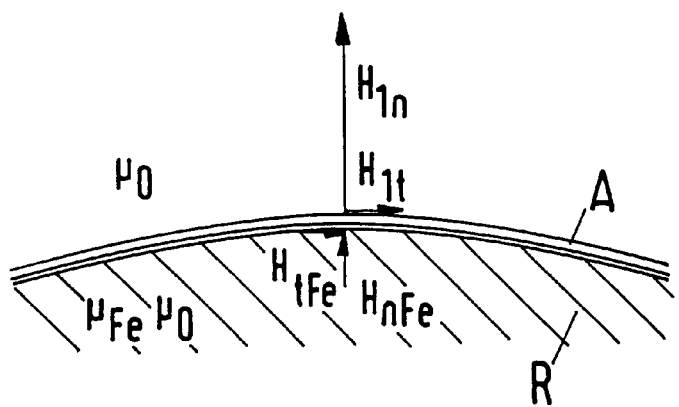
FIG. 12 shows the surface of a ferromagnetic body bounded by air, FIG. 13 illustrate a method of operation of the passive stabilization in a disc rotor motor (inner rotor) without an active axial bearing in an axial deflection of the rotor, FIG. 14 illustrate method of operation of the passive stabilization in a disc rotor motor (inner rotor) without an active axial bearing in a tilting of the rotor.

Simplifications are however required for the analytical investigation of the forces in electrical machines (see FIG. 12), The forces and torques respectively act at ferromagnetic bodies which are cylindrical in the case of a rotating electrical machine. In this it is assumed that the relative permeability of iron $\mu_{Fe}$ is very much greater than that of air ($\mu_0$).

The required conductors through which currents flow are for the greater part embedded in grooves. For the sake of simplicity the current can be replaced by an equivalent current in an infinitesimally thin layer at the rotor surface. This surface current density is designated as the current layer A.

The tangential components of the flux density in the air gap can be neglected with respect to the normal component.

It is known that, taking account of the above-named simplifications (see e.g. the rotor R in FIG. 12), the surface voltage $\sigma_{12}$ at a ferromagnetic body in the magnetic field is determined from the relationship:

$$\sigma_{12} = \begin{bmatrix} \frac{B_{1n}^2}{2\mu_0} \\ AB_{1n} \\ 0 \end{bmatrix} \tag{8}$$

with $B_{1n}$, designating the normal component of the air gap flux density ($B_{1n} = \mu_0 H_{1n}$), $\mu_0$ designating the magnetic permeability in air, and A designating the current layer at the surface.

In this the voltage component in the axial direction is zero as a result of the axial central position of the rotor.

The forces can be determined from the relationship $$dF = \sigma_{12} ds,$$

with dF representing a boundary surface element.

In the literature the normal component of the thus determined force is designated as the Maxwell force (force at the boundary surface of bodies with different permeabilities) and the tangential component as the Lorentz force (force on a current carrying conductor in the magnetic field). The resultant forces can be determined through integration over the entire surface.

In rotating electrical machines the flux density in the air gap and the armature current layer are in general periodic functions. These mainly non sinusoidal parameters can be represented with the help of Fourier series of the form $$f(\varphi) = \sum_{\mu=-\infty}^{\infty} c_\mu e^{j\mu\varphi}. \tag{9}$$
$$c_\mu \in C$$

In this, exclusively the so-called Fourier coefficients $c_\mu$ are of interest for characterizing the functions. These result as follows:

$$c_\mu = \frac{1}{2\pi} \int_{-\pi}^{\pi} f(\varphi) e^{-j\mu\varphi} d\varphi \tag{10}$$

Formally these Fourier coefficients can be collected together into an infinite column vector:

$$c = \begin{bmatrix} \vdots \\ c_{-2} \\ c_{-1} \\ c_0 \\ c_1 \\ c_2 \\ \vdots \end{bmatrix} \tag{11}$$

One can thereby in turn describe the function $$f(\varphi) = \Omega^T c \tag{12}$$

with $$\Omega = \begin{bmatrix} \vdots \\ e^{-2j\varphi} \\ e^{-j\varphi} \\ 1 \\ e^{j\varphi} \\ e^{2j\varphi} \\ \vdots \end{bmatrix} \tag{13}$$

The normal component of the flux density in the air gap can thus be given in the form:

$$B_{1n} = \Omega^T b. \tag{14}$$

The magnitude of the armature current layer can be given analogously as $$A = \Omega^T a. \tag{15}$$

The representation of the armature current layer A in accordance with equation (15) proves to be unfavorable for analytical investigations since no direct relationship to the loop currents exists. More favorable for the representation of the armature current layer A is the use of a distribution function of the windings. The current layer A can thereby be represented in the form:

$$A = \gamma I \tag{16}$$

$$\gamma = [\gamma_1 \ \gamma_2 \ \ldots \ \gamma_m], I = \begin{bmatrix} I_1 \\ I_2 \\ \vdots \\ I_m \end{bmatrix}.$$

Using Fourier coefficients for the distribution function one finally obtains the following relationship for the current layer in a machine with m winding systems:

$$A = \Omega^T dI \tag{17}$$

-continued $$d = \begin{bmatrix} \vdots & \vdots & & \vdots \\ d_{-2,1} & d_{-2,2} & \cdots & d_{-2,m} \\ d_{-1,1} & d_{-1,2} & \cdots & d_{-1,m} \\ d_{0,1} & d_{0,2} & \cdots & d_{0,m} \\ d_{1,1} & d_{1,2} & \cdots & d_{1,m} \\ d_{2,1} & d_{2,2} & \cdots & d_{2,m} \\ \vdots & \vdots & & \vdots \end{bmatrix}, I = \begin{bmatrix} I_1 \\ I_2 \\ \vdots \\ I_m \end{bmatrix}$$

The simplified voltage at the boundary surface of a ferromagnetic body with a current layer at the surface assumes the following form with the use of Fourier coefficients:

$$\sigma_{12} = \begin{bmatrix} \frac{1}{2\mu_0} b^T \Omega \Omega^T b \\ I^T d^T \Omega \Omega^T b \\ 0 \end{bmatrix} \quad (18)$$

The magnitude of the electrical torque M is obtained from the thrust voltage (only the tangential force contributes to the torque M; the tangential force is determined through integration of the tangential component of the thrust voltage over the surface elements; a surface element itself can be described by the length 1 multiplied by the radius r multiplied by dφ; the torque M then results from another multiplication by the radius r):

$$M = lr^2 \int_{-\pi}^{\pi} I^T d^T \Omega \Omega^T b d\varphi \quad (19)$$

$$M = lr^2 I^T d^T \left( \int_{-\pi}^{\pi} \Omega \Omega^T d\varphi \right) b$$

with 1 designating the axial rotor length and r designating the radius of the rotor.

In equation (19) only the term $\Omega \Omega^T$ is dependent on φ. Through this the definite integral can be solved and the following simplification results:

$$M = lr^2 I^T d^T mb \quad (20)$$

$$m = 2\pi \begin{bmatrix} & \cdot^{\cdot} & \cdot^{\cdot} & \cdot^{\cdot} & \\ & 0 & 0 & 1 & \cdot^{\cdot} \\ \cdot^{\cdot} & 0 & 1 & 0 & \cdot^{\cdot} \\ \cdot^{\cdot} & 1 & 0 & 0 & \\ & \cdot^{\cdot} & \cdot^{\cdot} & \cdot^{\cdot} & \end{bmatrix}$$

From the structure of the infinite matrix m one recognizes that exclusively harmonics of the current layer and of the flux density in the air gap with the same ordinal numbers in each case contribute to the torque. In a purely sinusoidal distribution of the flux density and of the armature current layer one obtains an electrical torque only with the same number of pole pairs of the two parameters.

In the calculation of the (transverse) forces on the rotor one can proceed in an analogous manner. Through integration over the rotor surface and the representation of the forces in the Cartesian coordinate system one obtains for the transverse forces:

$$F = lr \begin{bmatrix} \frac{1}{2\mu_0} & -I^T d^T \\ I^T d^T & \frac{1}{2\mu_0} b^T \\ 0 & 0 \end{bmatrix} \int_{-\pi}^{\pi} \begin{bmatrix} \Omega \Omega^T & \cos\varphi \\ \Omega \Omega^T & \sin\varphi \end{bmatrix} d\varphi b \quad (21)$$

$$F = lr \begin{bmatrix} \frac{1}{2\mu_0} & -I^T d^T \\ I^T d^T & \frac{1}{2\mu_0} b^T \\ 0 & 0 \end{bmatrix} \begin{bmatrix} f_1 \\ f_2 \end{bmatrix} b$$

with the following holding for $f_1$ and $f_2$:

$$f_1 = \pi \begin{bmatrix} & \cdot^{\cdot} & \cdot^{\cdot} & \cdot^{\cdot} & \cdot^{\cdot} & \cdot^{\cdot} \\ & 0 & 0 & 1 & 0 & 1 & \cdot^{\cdot} \\ \cdot^{\cdot} & 0 & 1 & 0 & 1 & 0 & \cdot^{\cdot} \\ \cdot^{\cdot} & 1 & 0 & 1 & 0 & 0 & \\ & \cdot^{\cdot} & \cdot^{\cdot} & \cdot^{\cdot} & \cdot^{\cdot} & \cdot^{\cdot} & \end{bmatrix} \quad (22)$$

$$f_2 = j\pi \begin{bmatrix} & \cdot^{\cdot} & \cdot^{\cdot} & \cdot^{\cdot} & \cdot^{\cdot} & \cdot^{\cdot} \\ & 0 & 0 & -1 & 0 & 1 & \cdot^{\cdot} \\ \cdot^{\cdot} & 0 & -1 & 0 & 1 & 0 & \cdot^{\cdot} \\ \cdot^{\cdot} & -1 & 0 & 1 & 0 & 0 & \\ & \cdot^{\cdot} & \cdot^{\cdot} & \cdot^{\cdot} & \cdot^{\cdot} & \cdot^{\cdot} & \end{bmatrix}$$

the sine and cosine functions in equation (21) are obtained through the passage from a cylindrical coordinate system of the rotor to a Cartesian coordinate system.

By considering $f_1$ and $f_2$ one recognizes that only those harmonics of which the ordinal numbers differ by one contribute to the transverse rotor force. If thus a torque and a transverse force are to be produced at the same time in a motor, one requires on the one hand a winding system with the same number of pole pairs as the excitation for the production of the torque (see equation (20)) and on the other hand a winding system with a number of pole pairs which differs by plus or minus one from that of the exciter system (see equation 22) for the production of the radial forces.

Figure 14:
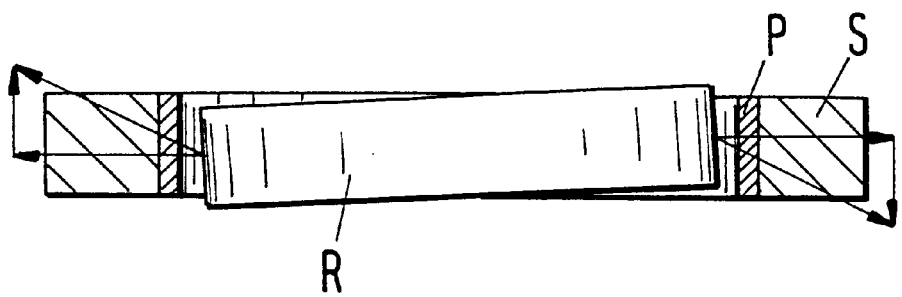
Figure 13:
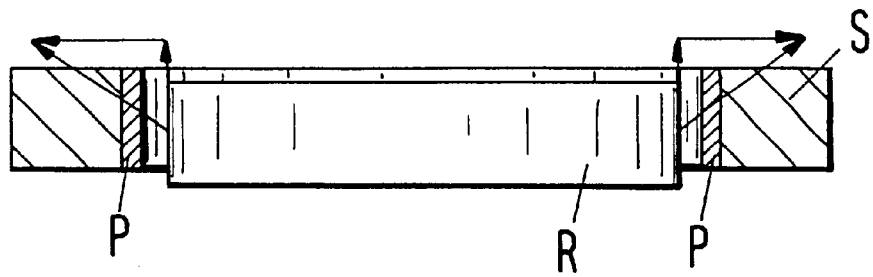

Typically a machine with a magnetic journalling is constructed from two partial motors and an axial bearing. This construction enables an active stabilization of five degrees of freedom. For special applications, such as e.g. ventilators or pumps, it is possible to keep the axial length of the rotor small in comparison with the diameter. Through this, three degrees of freedom (axial displacement and tilting about two axes) can be passively stabilized with permanent magnets. In FIG. 13 and FIG. 14 the passive stabilization of the rotor R through a pre-excitation with the help of permanent magnets P in the stator S is illustrated.

The axial deflection of the rotor produces an axial force (the forces are indicated by arrows) which is oppositely directed to the direction of the deflection and which stabilizes the rotor (FIG. 13). For an angular deflection or tilting (FIG. 14) a stabilizing torque sets in. The passive stabilization is admittedly simple, but brings about the disadvantage however that the dynamics of the journalling (i.e. the stiffness and damping) cannot be influenced.

The radial rotor position must be actively stabilized. For this at least two journalling winding systems are required which are arranged to be displaced by 90° (electrically) at the stator. For ventilator and pump applications of lower power, single-phase motors with only one winding system for the torque production are often used for reasons of costs. This winding arrangement can also be used for motors with magnetic journalling and lower power. In this it is to be observed that no rotary field can be produced with the help of a single-phase winding, but only an alternating field. There are thus rotor positions in which the torque is zero in spite of a current flow in the torque winding. This can lead to problems in particular during the starting of the motor. Through suitable measures (asymmetric lamina cut or asymmetric flux distribution in the air gap) it can be prevented that a stable rest position of the rotor caused by the rest torque coincides with a rotor position in which the electrical torque is zero.

The total winding construction of a motor with magnetic journalling thus requires three winding systems which must be supplied with current independently of one another in accordance with the rotor position, the required torque and the radial forces.

As already described, the torque winding must have the same number of pole pairs as the exciter system. The number of pole pairs of the journalling windings must differ by one from the number of pole pairs of the exciter system. The cost and complexity on the motor side should be as low as possible. With the help of these considerations the number of pole pairs of the exciter system can be set at two. The number of pole pairs two thereby likewise results for the torque winding and e.g. one can be chosen as the number of pole pairs for the journalling windings.

This winding system can be accommodated on a stator with four grooves. In FIG. 15 the two journalling windings 111, 112 are illustrated and in FIG. 16 the torque windings 113, 114, 115 and 116 are illustrated.

Furthermore, it must be predetermined whether the motor is to be designed as an inner rotor or as an outer rotor. When considering the forces (sum of the Maxwell and Lorentz forces) for the number of pole pairs chosen it is found that greater radial forces result for the outer rotor motor than for the inner rotor.

Figure 17:
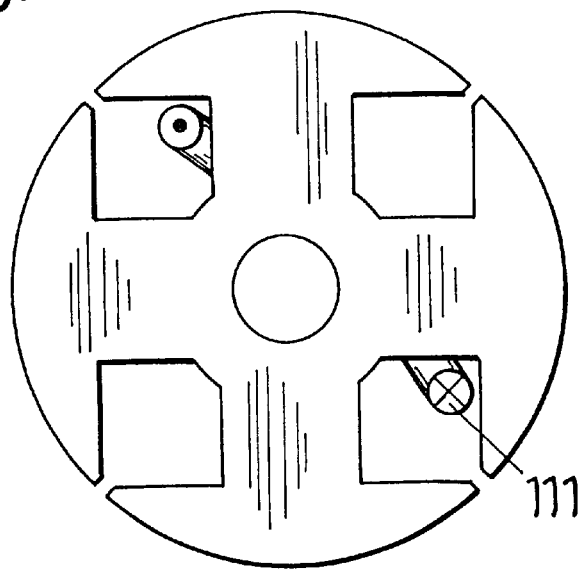
FIG. 17 shows a journalling winding of the single phase motor with one as the pole-pair number.
Figure 18:
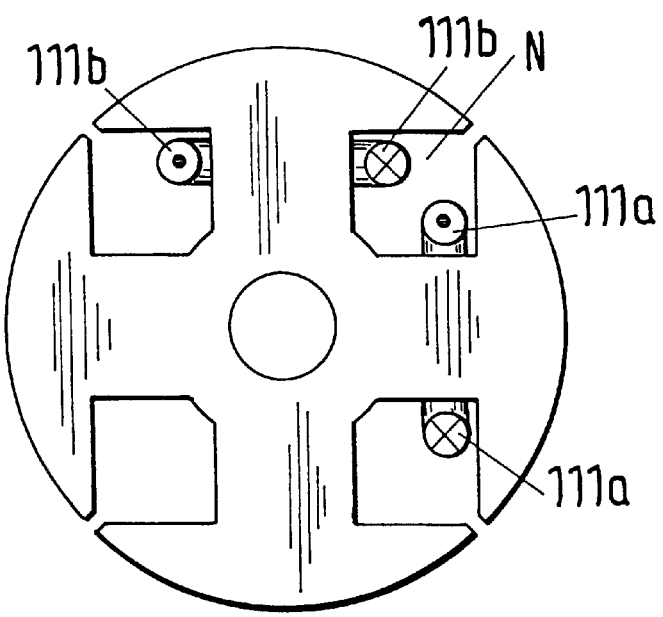
FIG. 18 shows a variant of the journalling winding of FIG. 17 using concentrated coils, which is simpler to manufacture.

A technical manufacturing simplification of a-single-phase-motors with magnetic journalling can be achieved through a modification of the winding arrangement. If a journalling winding 111 with one as the number of pole pairs is considered (FIG. 17), then the effect of this winding can be simulated by two concentrated coils 111a and 111b with the current flow illustrated in FIG. 18. The currents in the groove designated with N approximately cancel in their effect, but produce additional losses as a result of the greater wire lengths.

Through analogous considerations all journalling windings can be replaced by concentrated coils. One thereby obtains the winding arrangement illustrated in FIG. 19 with twelve concentrated coils 111a–111d, 112a–112d, as well as 113–116.

Figure 20:
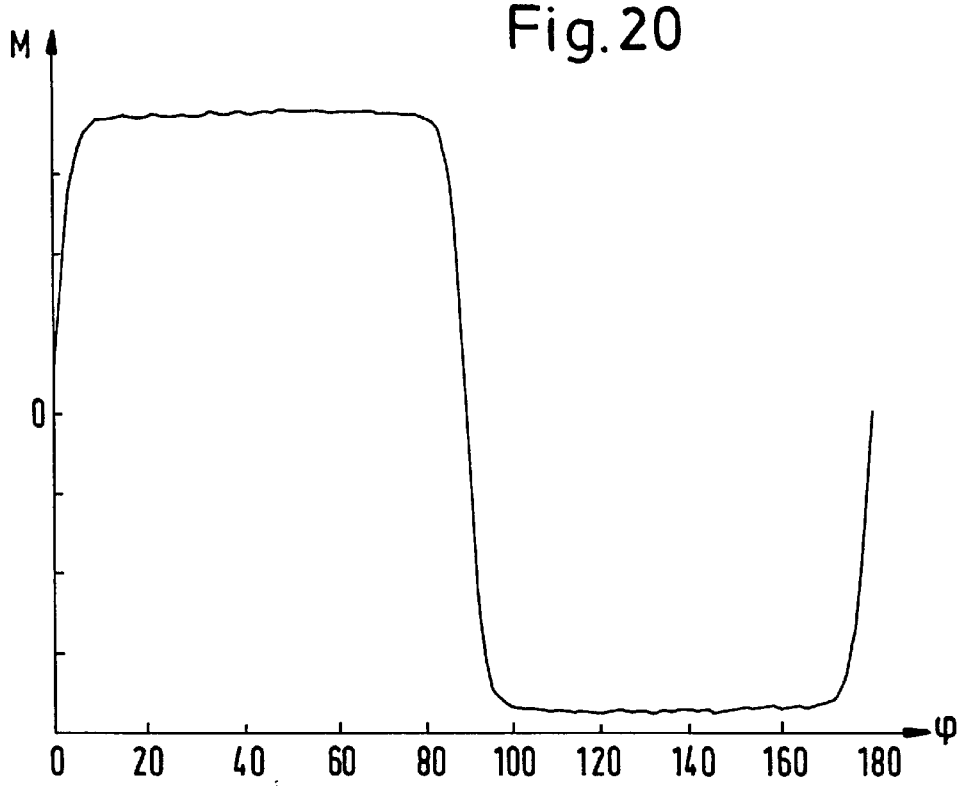
FIG. 20 is the torque plot of a single phase motor with magnetic journalling and concentrated coils in accordance with FIG. 19.

Transverse force plots which deviate very strongly from the ideal form (sinusoidal form) result through the use of concentrated coils. In FIG. 20 the torque plot M and in FIG. 21 the plot of the x and y components $F_x$ and $F_y$ respectively of the force F is plotted against the angle $\phi$.

Figure 21:
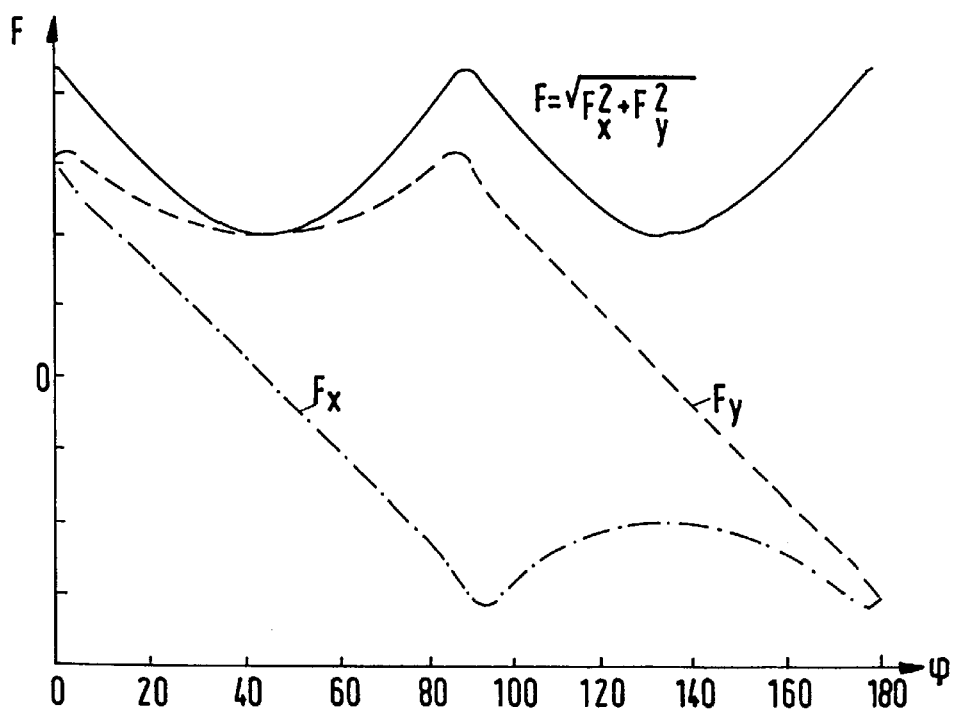
FIG. 21 is the journalling force plot of a single phase motor with magnetic journalling and concentrated coils in accordance with FIG. 19.

The calculation of the curve plots in FIG. 20 and FIG. 21 can be carried out with the help of a FEM (Finite Element Method) program. Since in this procedure the machine network must be generated anew in each position on a rotation of the rotor, relatively long computation times result.

Figure 22:
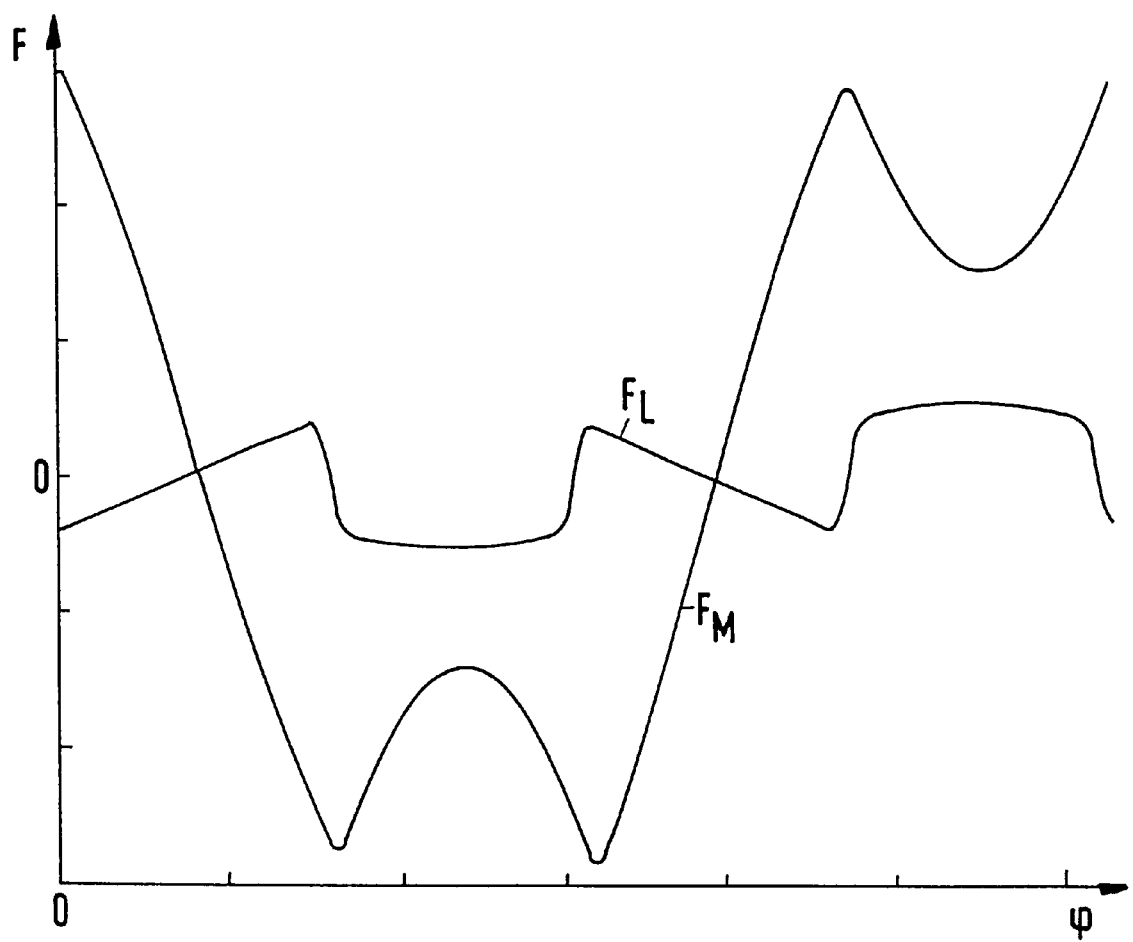
FIG. 22 is the plot of the Maxwell and the Lorentz forces of a single phase motor in accordance with FIG. 19.

The method in accordance with the invention is substantially more efficient in comparison with this. In the explained exemplary embodiment with the Fourier coefficients the normal component of the flux density distribution in the air gap is determined for only one rotor position by means of the FEM program, the Fourier coefficients are calculated therefrom, and the forces and torques respectively are calculated. A rotation of the rotor can then be simulated through a displacement of the flux density distribution and the armature current layers. A further advantage of this method is that the Maxwell forces $F_M$ and the Lorentz forces $F_L$ can be investigated separately (FIG. 22).

Figure 19:
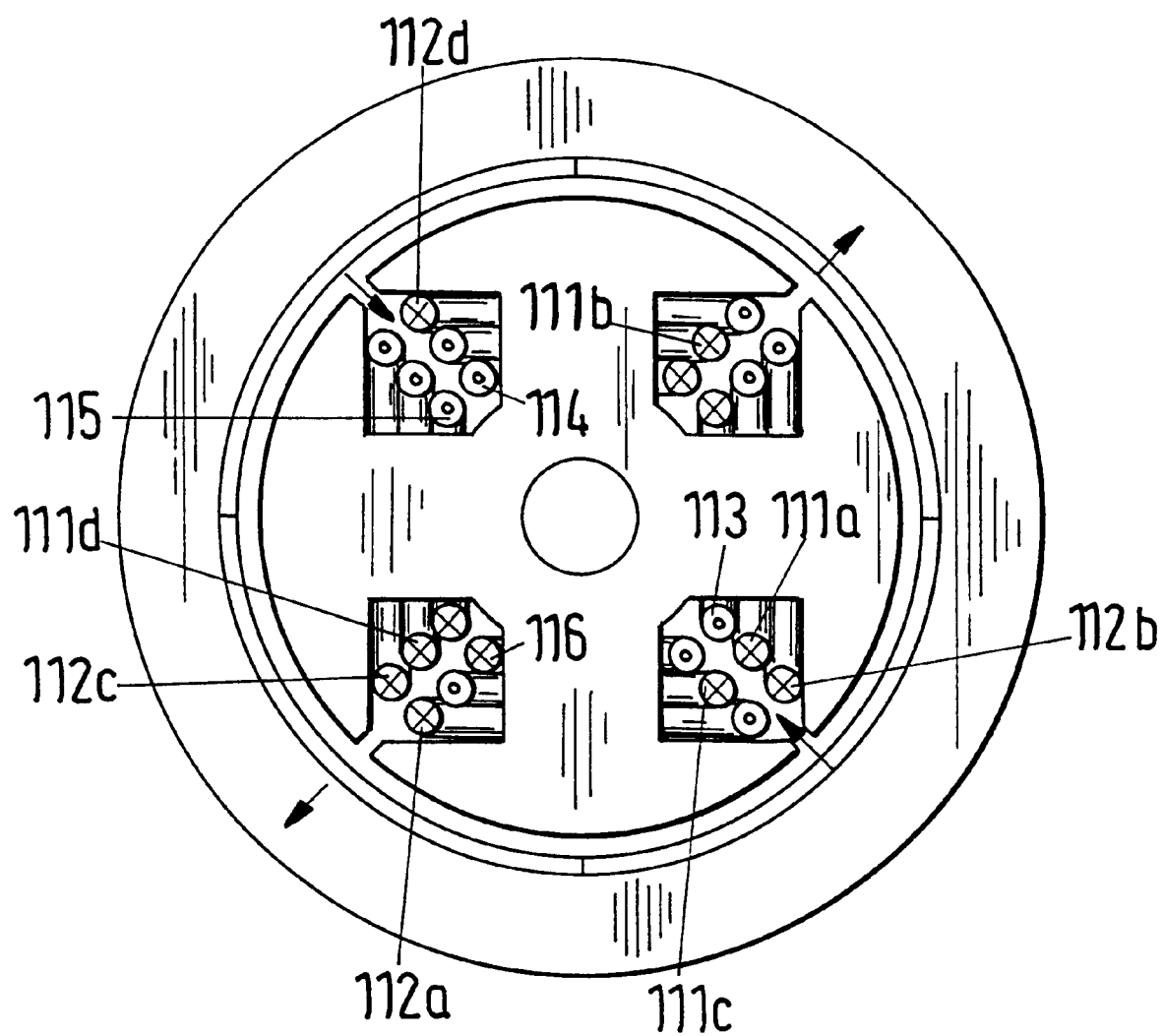
FIG. 19 shows a single phase motor with magnetic journalling (outer rotor) with twelve concentrated coils.

For the cost optimizing of the motor the twelve concentrated coils of FIG. 19 can be replaced by four concentrated coils (FIG. 3). The currents which are required for the production of the torques and forces must then be calculated and in each case cumulatively impressed in the individual coils, through which a more complicated and expensive signal and power electronic circuitry becomes necessary. As an advantage, however, there results the possibility that one can achieve a higher torque with lower required transverse forces and vice versa.

What is claimed is:

1. Method for the excitation of radial force and torque windings of an electromagnetic rotating machine having a stator, a rotor and an integrated magnetic bearing, the method comprising geometrically shaping the torque and radial force windings, introducing the windings in the stator or the rotor so that only a non-sinusoidal magneto-motive force or flux distribution is produced, providing a position and angle sensor system and therewith measuring a rotor position and a rotational angle of the rotor, and supplying the radial force and torque windings with phase currents depending on the rotational angle of the rotor so that resulting forces caused by the phase currents act radially and tangentially at the rotor or at the stator, respectively, substantially independently of the rotational angle of the rotor.

2. Method in accordance with claim 1 including decoupling the tangential and radial force components substantially independently of the rotational angle of the rotor.

3. Method in accordance with claim 2 wherein the step of decoupling comprises providing a decoupling network including at least one of hardware and software in an electrical circuit for the torque and radial force windings for assisting the decoupling of the tangential and radial force components.

4. Method in accordance with claim 1 wherein deviations from a sinusoidal form of force components which act radially at the rotor or at the stator, respectively, depend on the rotational angle of the rotor, and correcting the deviations with correspondingly formed phase current behaviors.

5. Method in accordance with claim 1 wherein deviations from a sinusoidal form of torques which are formed by the force components and act tangentially at the rotor or at the stator, respectively, depend on the rotational angle of the rotor, and correcting the deviations of predetermined phase currents with correspondingly formed phase current behaviors in dependence on the rotational angle.

6. Method in accordance with claim 1 including applying required phase currents to the torque and radial force windings directly as phase currents or indirectly as voltages.

7. Method in accordance with claim 1 including superimposing an operating behavior onto the rotating machine which corresponds to an operating behavior of a machine with an approximately sinusoidal exciter field distribution and an approximately sinusoidal flux distribution.

8. Method in accordance with claim 1 wherein the phase currents satisfy the relationship $$\Delta I = \left(\frac{\partial}{\partial I}Q(I_0, \varphi, x_0)\right)^{-1}\left(Q - Q(I_0, \varphi, x_0) - \frac{\partial}{\partial x}Q(I_0, \varphi, x_0)\Delta x\right)$$

and, in a region of a position $x_0=0$ of the rotor and in a region of $I=I_0$, the relationship $$I = k(\varphi)Q,$$

wherein

Q designates the vector of the radial forces and of the torque, $x_0$ designates the vector of a position of the rotor when the rotor is in a rest position, $\Delta x$ designates a deviation of the position of the rotor from the rest position, I designates the vector of the phase currents, $I_0$ designates the vector of the phase currents when the rotor is in the rest position $x_0$, $\Delta I$ designates the current variation, $\varphi$ designates the rotational angle of the rotor, and $k(\varphi)$ designates a matrix which depends on the rotational angle of the rotor $\varphi$.

9. Method in accordance with claim 1 wherein the radial force and torque windings are separate, and including determining separate phase currents being fed to the radial force windings and the torque windings during determining required loop currents for controlling radial and tangential forces generated by the respective windings, current components for producing the radial forces and current components for producing torques being superimposed on the respective phase currents.

10. Method in accordance with claim 1 wherein the radial force and torque windings are common windings, and determining phase currents which contain components for producing the radial force and components for producing the torque during determining required phase currents for controlling the radial and tangential forces, and superimposing current components for producing the radial forces and current components for producing the torques on the respective phase currents.

11. Method in accordance with claim 1 including performing a calibration run for optimizing force and current values from predetermined non-optimal force and current values.

12. Arrangement for the excitation of radial force and torque windings of an electrical drive having an integrated magnetic bearing, the arrangement comprising an electrical machine with radial force and torque windings in a stator or a rotor of the machine, a position and angle sensor system, electric circuitry for controlling and regulating the machine, one of a sensor system and a computational circuit for measuring or calculating, respectively, momentary values of at least one of current and voltage in the radial force and torque windings, a rotor position, a rotational angle and parameters derived therefrom, electric circuits for carrying out at least one of signal processing and signal evaluation with hardware, software or with value tables, and power controllers for superimposing at least one of phase currents and phase voltages onto the radial force and torque windings of the electrical machine.

* * * * *